United States Patent [19]

Wayne et al.

[11] Patent Number: 5,006,983

[45] Date of Patent: Apr. 9, 1991

[54] SERVICE ALLOCATION SYSTEM

[75] Inventors: Kenneth P. Wayne, Swampscott; Jay P. Werb, Newton, both of Mass.

[73] Assignee: Addax, Inc., Cambridge, Mass.

[21] Appl. No.: 406,157

[22] Filed: Sep. 12, 1989

[51] Int. Cl.⁵ ............................................. G06F 15/21
[52] U.S. Cl. ................................. 364/401; 340/286.06
[58] Field of Search ............................... 364/401, 402; 340/825.44, 286.06

[56] References Cited

U.S. PATENT DOCUMENTS

| | | | |
|---|---|---|---|
| 4,382,256 | 5/1983 | Nagata | 340/825.44 |
| 4,398,257 | 8/1983 | Paganini et al. | 364/550 |
| 4,575,707 | 3/1986 | Imazeki et al. | 340/286.01 |
| 4,675,647 | 6/1987 | Salin et al. | 340/286.06 |
| 4,700,295 | 10/1987 | Katsof et al. | 364/401 |
| 4,757,529 | 7/1988 | Glapa et al. | 379/244 |
| 4,788,715 | 11/1988 | Lee | 379/84 |
| 4,858,120 | 8/1989 | Samuelson | 364/401 |

FOREIGN PATENT DOCUMENTS 0225482 12/1984 Japan .

OTHER PUBLICATIONS

Shogetsu, *Patent Abstracts of Japan*, Group No. p596, vol. 11, No. 219, Abstract No. 62-37769.
Suzuki, *Patent Abstracts of Japan*, Group No. p615, vol. 11, No. 283, Abstract No. 62-79567.
*Chain Store Age Executive*, vol. 64, Sep. 1988, "Customer-Activated Pager Keeps Low Profile", p. 74.

Primary Examiner—Jerry Smith
Assistant Examiner—David Huntley
Attorney, Agent, or Firm—Fish & Richardson

[57] ABSTRACT

A system for allocating service resources to a plurality of individuals who have requested services includes a plurality of communication devices, each one of which is for assignment to a different one of the individuals; assignment logic for assigning each one of the individuals to a corresponding one of the queues, each one of the of queues a different priority associated with it; indication logic for indicating that a service resource is or will become available to serve a next individual; selection logic for selecting the next individual from the queue having the highest priority and having at least one individual assigned to it; and a communicator for communicating with the communication device assigned to the next individual so as to notify the next individual that service is available. The communication devices are handheld wireless pagers. The communicator is a wireless transmitter.

34 Claims, 20 Drawing Sheets

ISSUE A PAGER ⟵ 44

| | |
|---|---|
| 46(a) DESIRED TRANSACTION: | SALES |
| 46(b) EXPERIENCE REQUIRED: | NOVICE |
| 46(c) SERVICE LEVEL: | GENERAL |
| 46(d) PAGER NUMBER: | 2226 |
| 46(e) CUSTOMER'S NAME: | (customer's name) |
| 46(f) POSITION | 18 |
| 46(g) ESTIMATED TIME UNTIL SERVICE: | 20 @ time |

FIG. 3

VIEW PAGER STATUS /—60

| | |
|---|---|
| 62(1) — DESIRED TRANSACTION: | SALES |
| 62(2) — EXPERIENCE REQUIRED: | NOVICE |
| 62(3) — SERVICE LEVEL: | GENERAL |
| 62(4) — PAGER NUMBER: | 2226 |
| 62(5) — CUSTOMER NAME: | (customer name) |
| 62(6) — POSITION: | 9 |
| 62(7) — TIME SINCE ARRIVAL (INITIAL QUOTE): | 10  (20) |
| 62(8) — ESTIMATED TIME UNTIL SERVICE: | 13 @ time |

FIG. 4

| | |
|---|---|
| RESERVATION DESK FUNCTIONS | ← 70 |
| SALES DESK # XXX | 74 |
| PAGE A CUSTOMER | 72(1) |
| REPAGE NEXT CUSTOMER | 72(2) |
| UNPAGE THE CUSTOMER | 72(3) |
| COLLECT PAGER | 72(4) |
| PREPAGE NEXT CUSTOMER | 72(5) |
| LONG REISSUE | 72(6) |
| END CUSTOMER TRANSACTION | 72(7) |
| SIGN-IN | 72(8) |
| SIGN-OFF | 72(9) |
| HANDOVER | 72(10) |
| BREAKS | 72(11) |
| VIEW A CUSTOMER | 72(12) |
| EXIT THE TRAVEL CONSULTANT SYSTEM | 72(13) |

FIG. 5

| | 80 ↘ 82 84 | |
|---|---|---|
| CUSTOMER NAME: | (customer name) | |
| BUSINESS TYPE: | business/leisure | |
| CUSTOMER TYPE: | male/female - U.S./foreign - under 30/30-50/OVER 50 | |
| TRANSACTION TYPE: | REISSUE/INFORMATION/NEW BOOKING/HOLIDAY PACKAGE | |
| PHONE NUMBER: | (B) 445-9876 | |

| | VALUE | | COMMISSION (%) | | |
|---|---|---|---|---|---|
| AIR - | 10000.00 | × | 10.00 | = | 1000.00 |
| CAR - | 2000.00 | × | 9.00 | = | 180.00 |
| HOTEL - | 3000.00 | × | 10.00 | = | 300.00 |
| HOLIDAY - | 0.00 | × | 5.00 | = | 0.00 |
| INSURANCE - | 0.00 | × | 5.00 | = | 0.00 |
| OTHER - | 0.00 | × | 0.00 | = | 0.00 |
| | | | TOTAL TRANSACTION INCOME | = | 1480.00 |

FIG. 6

| | | | |
|---|---|---|---|
| | SALES/IMMEDIATE/SHOPPING | | | 102 (1)
| | SALES/IMMEDIATE/WAITING | | | 102 (2)
| | SALES/IMMEDIATE/ANGRY | | | 102 (3)
| | SALES/PRIORITY/SHOPPING | | | 102 (4)
| | SALES/PRIORITY/WAITING | | | 102 (5)
| | SALES/PRIORITY/ANGRY | | | 102 (6)
| | SALES/GENERAL/SHOPPING | | | 102 (7)
| | SALES/GENERAL/WAITING | | | 102 (8)
| | SALES/GENERAL/ANGRY | | | 102 (9)
| | SERVICE/IMMEDIATE/SHOPPING | | | 102 (10)
| | SERVICE/IMMEDIATE/WAITING | | | 102 (11)
| | SERVICE/IMMEDIATE/ANGRY | | | 102 (12)
| | SERVICE/PRIORITY/SHOPPING | | | 102 (13)
| | SERVICE/PRIORITY/WAITING | | | 102 (14)
| | SERVICE/PRIORITY/ANGRY | | | 102 (15)
| | SERVICE/GENERAL/SHOPPING | | | 102 (16)
| | SERVICE/GENERAL/WAITING | | | 102 (17)
| | SERVICE/GENERAL/ANGRY | | | 102 (18)
| | HOLIDAY/IMMEDIATE/SHOPPING | | | 102 (19)
| | HOLIDAY/IMMEDIATE/WAITING | | | 102 (20)
| | HOLIDAY/IMMEDIATE/ANGRY | | | 102 (21)
| | HOLIDAY/PRIORITY/SHOPPING | | | 102 (22)
| | HOLIDAY/PRIORITY/WAITING | | | 102 (23)
| | HOLIDAY/PRIORITY/ANGRY | | | 102 (24)
| | HOLIDAY/GENERAL/SHOPPING | | | 102 (25)
| | HOLIDAY/GENERAL/WAITING | | | 102 (26)
| | HOLIDAY/GENERAL/ANGRY | | | 102 (27)

| TRANSACTION TYPE | SERVICE LEVEL | STATUS | F | ORDER IN QUEUE | ... |
|---|---|---|---|---|---|
| 204(1) | 204(2) | 204(3) | 204(4) | 204(5) | |

| 43(1) | 43(2) | 43(3) | 43(4) | 43(5) | 43(6) | 43(7) | 43(8) | 43(9) |
|---|---|---|---|---|---|---|---|---|
| $NAME_1$ | $ID_1$ | $SALES\ EXP_1$ | $SERVICE\ EXP_1$ | $HOLIDAY\ EXP_1$ | $FUNCTION_1$ | $DESK_1$ | $G_1$ | $TIME_1$ |
| $NAME_2$ | $ID_2$ | $SALES\ EXP_2$ | $SERVICE\ EXP_2$ | $HOLIDAY\ EXP_2$ | $FUNCTION_2$ | $DESK_2$ | $G_2$ | $TIME_2$ |
| $NAME_n$ | $ID_n$ | $SALES\ EXP_n$ | $SERVICE\ EXP_n$ | $HOLIDAY\ EXP_n$ | $FUNCTION_n$ | $DESK_n$ | $G_n$ | $TIME_n$ |

41

CONTROL INFORMATION
AVAILABLE FOR "NOW" ONLY  ⟵110

| | ------- Number of Customers ------- | | | | | ------- Desks ------- | | |
|---|---|---|---|---|---|---|---|---|
| | Total | Shopping | Waiting | Angry | In Service | Open | Unavailable | Needed |
| Sales | | | | | | | | |
| Total | xxx | xxx | xxx | xxx | xxx | (xxx) | xxx | xxx |
| General | xxx | xxx | xxx | xxx | xxx | | | |
| Priority | xxx | xxx | xxx | xxx | xxx | | | |
| Immediate | xxx | xxx | xxx | xxx | xxx | | | |
| Service | | | | | | | | |
| Total | xxx | xxx | xxx | xxx | xxx | (xxx) | xxx | xxx |
| General | xxx | xxx | xxx | xxx | xxx | | | |
| Priority | xxx | xxx | xxx | xxx | xxx | | | |
| Immediate | xxx | xxx | xxx | xxx | xxx | | | |
| Holiday | 112 | 114 | | 116 | | | | |
| Total | (xxx) | (xxx) | (xxx) | xxx | xxx | (xxx) | xxx | xxx |
| General | (xxx) | (xxx) | (xxx) | xxx | xxx | | | |
| Priority | xxx | xxx | xxx | xxx | xxx | | | |
| Immediate | xxx | xxx | xxx | xxx | xxx | | | |

FIG. 14a

STATUS INFORMATION  ⟵120
AVAILABLE FOR ANY TIME PERIOD OF THE DAY
(E.G. 0700 TO "NOW")

| | | ------- Agent ------- | | | | |
|---|---|---|---|---|---|---|
| | Commissions | Hours | Active | Waiting | Break | Productivity |
| Total: | $xx,xxx,xxx | xxx | xx% | xx% | xx% | $xxx,xxx |
| Sales: | $xx,xxx,xxx | xxx | xx% | xx% | xx% | $xxx,xxx |
| Service: | $xx,xxx,xxx | xxx | xx% | xx% | xx% | $xxx,xxx |
| Holiday: | $xx,xxx,xxx | xxx | xx% | xx% | xx% | $xxx,xxx |

| | ------- Customers ------- | | | ----- Service Quality ----- | | |
|---|---|---|---|---|---|---|
| | Count 113 | Lost | Repaged | OK | Fair | Poor |
| Total: | (x,xxx) | xxx% | xxx% | xxx% | xxx% | xxx% |
| Sales: | x,xxx | xxx% | xxx% | xxx% | xxx% | xxx% |
| Service: | x,xxx | xxx% | xxx% | xxx% | xxx% | xxx% |
| Holiday: | (x,xxx) 113 | xxx% | xxx% | xxx% | xxx% | xxx% |

FIG. 14b

| QUEUE CONTROL | | | |
|---|---|---|---|
| | # IN QUEUE | # TO MOVE | TO LEVEL |
| SALES | | | |
| GENERAL | 25 | 10 | IMMEDIATE |
| PRIORITY | XXX | XXX | XXX |
| IMMEDIATE | XXX | XXX | XXX |
| SERVICE | | | |
| GENERAL | XXX | XXX | XXX |
| PRIORITY | XXX | XXX | XXX |
| IMMEDIATE | XXX | XXX | XXX |
| HOLIDAY | | | |
| GENERAL | XXX | XXX | XXX |
| PRIORITY | XXX | XXX | XXX |
| IMMEDIATE | XXX | XXX | XXX |

FIG. 18a

| WAIT PARAMETERS FOR QUEUE MONITORING | | |
|---|---|---|
| | DESIRED WAIT | MAX ACCEPTABLE WAIT |
| SALES | | |
| GENERAL | XXX | XXX |
| PRIORITY | XXX | XXX |
| IMMEDIATE | XXX | XXX |
| SERVICE | | |
| GENERAL | XXX | XXX |
| PRIORITY | XXX | XXX |
| IMMEDIATE | XXX | XXX |
| HOLIDAY | | |
| GENERAL | XXX | XXX |
| PRIORITY | XXX | XXX |
| IMMEDIATE | XXX | XXX |

FIG. 18b

| WAIT TIMES WITH USER OVERRIDES | | |
|---|---|---|
| | SYSTEM WAITS | USER OVERRIDE WAITS |
| SALES | | |
|     GENERAL | 30 | 15 |
|     PRIORITY | XXX | XXX |
|     IMMEDIATE | XXX | XXX |
| SERVICE | | |
|     GENERAL | XXX | XXX |
|     PRIORITY | XXX | XXX |
|     IMMEDIATE | XXX | XXX |
| HOLIDAY | | |
|     GENERAL | XXX | XXX |
|     PRIORITY | XXX | XXX |
|     IMMEDIATE | XXX | XXX |

FIG. 19

SERVICE ALLOCATION SYSTEM

BACKGROUND OF THE INVENTION

The invention relates to a system for allocating service resources to customers.

In many retail establishments, such as, travel agencies, auto repair centers, and medical practices, to name but a few, the customer's experience often matches what one would expect in an overcrowded bakery. When the customer enters the establishment, he discovers that a number of other customers have preceded him and are still waiting their turn to be served. If leaving to return another time is not an option he wishes to exercise, he must then find the end of the line that has formed and join the others to wait his turn. If the number of customers who have preceded him is large, his wait can be aggravatingly long. And if there are too few chairs for everybody, a long wait can become tiring. Often adding to his aggravation are those one or two individuals who invariably seem to appear and ignore that some people may be ahead of them. All in all, by the time the customer's turn has arrived, it is not unusual to find him in a very unpleasant mood.

Of course, some techniques are used to reduce the aggravation associated with the long wait in line. One such technique involves a ticket machine that dispenses to each new customer a number indicating his position in line. When a sales person becomes available to serve another customer, a number is displayed to notify the next customer in line that service is now available for him. This helps assure that people are served in order of their arrival and permits customers to relax a little more during the wait. However, even with such techniques, the customer typically must resign himself to having to sacrifice a usually unforeseeable amount of his valuable time remaining continually attentive to his place in line and waiting until his turn finally comes.

SUMMARY OF THE INVENTION

In general, in one aspect, the invention is a system for allocating service resources to a plurality of individuals who have requested services. The system includes a plurality of communication devices, each one of which is for assignment to a different one of the individuals; assignment means for assigning each one of the of individuals to a corresponding one of a plurality of queues, each one of the queues having a different priority associated with it; indication means for indicating that a service resource is or will become available to serve a next individual; selection means responsive to said indicating means for selecting the next individual from the queue having the highest priority and having at least one individual assigned to it; and communication means for communicating with the communication device assigned to the next individual so as to notify the next individual that service is available.

Preferred embodiments include the following features. The selection means selects the next individual from a queue on a first-in-first-out basis. The system further includes reassignment means for automatically reassigning individuals assigned to certain of the queues to other queues, each such reassignment being to a queue of higher priority than the queue from which the individual is being reassigned. The reassignment means reassigns the assigned individual based upon the amount of time that has elapsed since the assigned individual was first assigned to one of the queues. Certain of the queues are holding queues from which the selection means may not make any selections. The assignment means initially assigns each one of the individuals to a corresponding one of the holding queues. The system also includes computation means for computing an expected wait time for an assigned individual based upon that individual's position in the queue to which that individual is presently assigned, the expected wait time for an assigned individual being an estimate of how long that individual must wait before being notified that service is available. The computation means computes the expected wait time for an assigned individual by estimating the number of individuals that will be served before that individual. The computation means estimates the number of individuals that will be served before that individual by determining the number of individuals that are assigned to queues that are of higher priority than the queue to which that individual is presently assigned. And the computation means computes the expected wait time for an assigned individual by estimating the amount of time required for the service resources to provide services to individuals who will be served prior to the assigned individual. Further, the system also includes means for generating a performance measure, the performance measure being based on the time that assigned individuals are in the queues before being selected for a service resource.

Also in preferred embodiments the queues include a group of queues for each service type and the assignment means assigns an individual to a queue within the group of queues that corresponds to the service type assigned to that individual. The communication devices are pagers and the communication means communicates with the pagers by sending a message notifying the individual that a service resource is available to serve that individual. The message also identifies the location of the service resource that is available to serve that individual. The service resources are employees of a business. And the selection means selects as the next individual the individual who has been assigned to the queue for the longest period of time.

In general, in another aspect, the invention features a plurality of communication devices, each one of the communication devices for assignment to a different one of the individuals; assignment means for assigning each one of the individuals to a corresponding one of the queues; computation means for computing an expected wait time for an assigned individual based upon that individual's position in the queue to which that individual is presently assigned, the expected wait time for an assigned individual being an estimate of how long that individual must wait before being notified that service is available; indication means for indicating that a service resource is or will become available to serve a next individual; selection means responsive to said indication means for selecting the next individual from one of the queues; and communication means for communicating with the communication device assigned to the next individual so as to notify the next individual that service is available.

In general, in still another aspect, the invention features a plurality of communication devices, each one of the communication devices for assignment to a different one of the individuals; assignment means for assigning each one of the individuals to a corresponding one of the queues; estimation means for estimating the number of service resources needed to provide a predetermined level of service, the estimate being based upon the number of individuals assigned to the queues; indication means for indicating that a service resource is or will become available to serve a next individual; selection means responsive to said indicating means for selecting the next individual from one of the queues; and communication means for communicating with the communication device assigned to the next individual so as to notify the next individual that service is available.

Preferred embodiments include the following features. The estimation means uses a queueing algorithm to estimate the number of service resources needed and it estimates the number of service resources needed based upon a moving average of the number of individuals who have requested services for a previous preselected period of time. The queueing algorithm is based on an assumption that queues are Markovian and that they are first-in-first out queues.

The invention offers numerous advantages. If used in a travel agency, for example, the invention enables customers to more efficiently use their time while waiting to be paged to an available travel agent. Thus, if the invention is used in a location that has other retail concessions nearby, the customer can visit those other concessions and conduct business without having to worry about losing his place in line and with the full confidence that he will be paged when his turn comes up. The customer benefits by being able to more efficiently use his time and the other retail concessions benefit by being able to offer services to those travel agency customers who are waiting to be served by the travel agency.

In addition, neither the customers of the travel agency nor the travel agency itself needs to contend with the pressure often associated with having long lines of people waiting to be served. Visibly long lines tend to discourage customers from entering the agency and also place pressure on the service personnel to process customers quickly, possibly at the expense of service quality. Furthermore, since the invention estimates the expected waiting time for each customer, customers know how much time is available for them to conduct business or just window shop in the nearby retail concessions.

The invention also provides the travel agency with more strict control over how different classes of customers are served. The strict control improves the travel agency's ability to more efficiently and effectively provide travel services to its customers. Furthermore, the invention generates valuable statistics about the customers served by the travel agency, the timeliness of the service provided, the working efficiency of staff and the distribution of services provided.

Other advantages and features will become apparent from the following description of the preferred embodiment and from the claims.

DESCRIPTION OF THE PREFERRED EMBODIMENT

FIG. 3 is an "Issue A Pager" form that is accessible through the reception desks function menu;

FIG. 4 is a "View Pager Status" form that is accessible through the reception desks function menu;

FIG. 5 is a reservation desk functions menu;

FIG. 6 is an "End Transaction" form that is accessible through the reservation desk function menu;

FIG. 7 depict the queues to which customers are assigned by CHAPS;

FIG. 8 depicts a portion of the datastructure of the customer database;

FIG. 9 depicts a portion of the datastructure of the travel consultant database;

FIG. 14a is a control information table;

FIG. 14b is a status information table;

FIG. 18a is a Queue Control Table that is accessible through the controller functions menu;

FIG. 18b is a Service Time Standards Table that is accessible through the controller functions menu; and FIG. 19 is a Wait Time Table that is accessible through the controller functions menu.

OVERVIEW OF SYSTEM ARCHITECTURE

Figure 1:
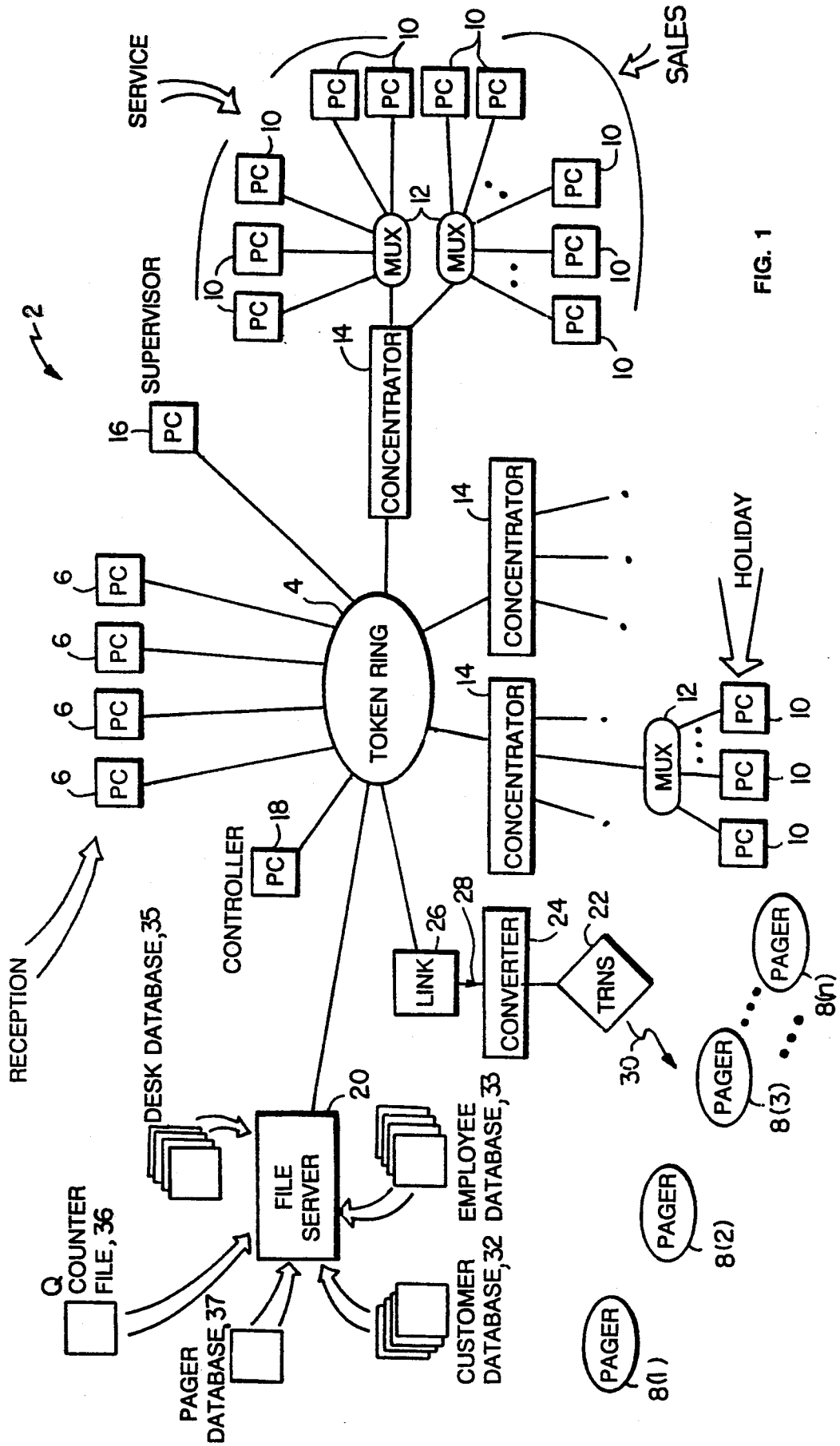
FIG. 1 is a block diagram of a customer handling and planning system (CHAPS)

FIG. 1 illustrates the overall architecture of a Customer Handling And Planning System (CHAPS) 2 that is used in a large travel agency to allocate travel services to customers. The backbone of CHAPS 2 is a token ring network 4 to which are connected different groups of workstations, each of which is associated with a different business function. Two general business functions commonly found within a travel agency are reception services and travel services, the latter consisting of three types, namely, holiday, sales and service. In the travel agency in which CHAPS 2 is installed, the reception services and each of the types of travel services are associated with geographically distinct, separated areas within the building and a group of workstations is assigned to each such area.

The reception area includes four workstations 6 that are used by receptionists assigned to that area to enter information relating to new customers who request travel services. Also located in the reception area is a supply of digital pagers 8(1)-8(n) (generally referred to as pagers 8) that the receptionists assign, one at a time, to the new customers and which are used to notify that customer when a travel agent is available to provide them the services that they have requested. Each pager 8 has a unique pager code which transmitter 22 uses to signal a page and a unique four-digit checksum identification which CHAPS 2 uses to refer to a pager. This minimizes data entry errors. Each pager 8 also includes a liquid crystal display screen capable of displaying short messages sent to the customer. Also pager 8 emits an audible tone when paged to alert the customer that he is being paged and to indicate that he should look at the screen on the pager 8 for more information, such as the location of the travel agent who will serve him. The pager codes and four-digit checksum id's are stored in a pager database 37.

After a customer has arrived at the reception area and has received a pager 8, the customer is free to leave the reception area and to conduct other business within the facility until paged to an available travel agent. Thus, it is desirable to use CHAPS 2 in a location which has other retail concessions located conveniently nearby. While the customer is waiting for the paging message, he can visit those other retail concessions and take advantage of the services available there.

Each of the travel service areas also includes workstations 10 for use by the agents assigned to those areas. In a large travel agency, the number of workstations 10 located in each of the three travel service areas may be large, particularly in the sales and the service areas where a greater amount of the customer traffic is typically encountered. Because of the large number of workstations 10, other equipment is provided to link workstations 10 to token ring 4. More specifically, workstations 10 are connected to multiplexers 12 which can handle up to eight different workstations 10. Multiplexers 12 are, in turn, connected to concentrators 14 which also have the ability to receive input signals coming from many different multiplexers 12 and feed those signals onto a single line (and vice versa). Each concentrator 14 can connect up to four multiplexers 12 to token ring 4.

CHAPS 2 also includes a supervisor workstation 16, a controller workstation 18 and a file server 20, each of which is directly connected to token ring 4. Controller workstation 18 has the ability to run a Management Analysis Program, which summarizes and analyzes the customer data that is accumulated by CHAPS 2 during its operation. File server 20 is the central data repository and data exchange for all of workstations 6, 10, 16 and 18 on token ring 4. File server 20 stores programs that are used to allocate available service resources to waiting customers in accordance with rules to be described later and it stores databases and files that contain data used by CHAPS 2, including a customer database 32, an employee database 33, a desk database 35, a Q counter file 36, a pager database 37 a Service Standards database and a User Wait Time database, the purposes of which will become apparent from the following description of the operation of CHAPS 2.

To communicate with pagers 8 that are assigned to customers, CHAPS 2 also includes a transmitter 22 that is connected to token ring 4 through a converter 24 and a link machine 26. Link machine 26 continually monitors customer file index 36 to determine which customer needs to be paged and when appropriate it generates a paging signal 28. Converter 24 converts paging signal 28 into the format required by transmitter 22, which them transmits the corresponding message 30 to pagers 8.

CHAPS 2 uses commercially available equipment. Workstations 6, 10, 16 and 18 and link machine 26 are IBM PS/2 Model 50C computers. Link machine 26 has been programmed to carry out its monitoring functions and to generate the paging signals 28 that are required for sending messages 30. File server 20 runs on a IBM PS/2 Model 80 for high performance. Multiplexers 12 are Baytechs, Model 528H, which are of the type that are widely used to consolidate signals from multiple grocery store scanners into a single cable. Concentrators 14 are IBM PS/2's configured and programmed to perform the functions of a concentrator and can handle up to four multiplexers 12. Converter 24 is a computer manufactured by Zetron of California, which converts signals from PS/2 asynchronous format to the POCSAC format of transmitter 22. Finally, transmitter 22 is manufactured by Air Call of England for pager systems.

Operation of Service Allocation System

CHAPS 2 includes applications programs that provide at least three user interfaces for access to CHAPS 2 and which implement the resource allocation algorithms, among others, that are performed by CHAPS 2. The three user interfaces relate to reception desk functions, reservation desk functions and controller functions. The reception desk functions and the reservation desk functions are used by receptionists and agents to enter information that CHAPS 2 uses to automatically page customers as agents become available. The controller desk functions are used by a controller to monitor the overall performance of CHAPS 2 and to make trade-offs in system performance. (The controller is an employee who is responsible for monitoring the performance of the store, the receptionists and the agents.) The following description addresses the reception desk functions, the reservation desk functions, the various resource allocation algorithms, and the controller desk functions in that order.

Receptionist Desk Functions

Figure 2:
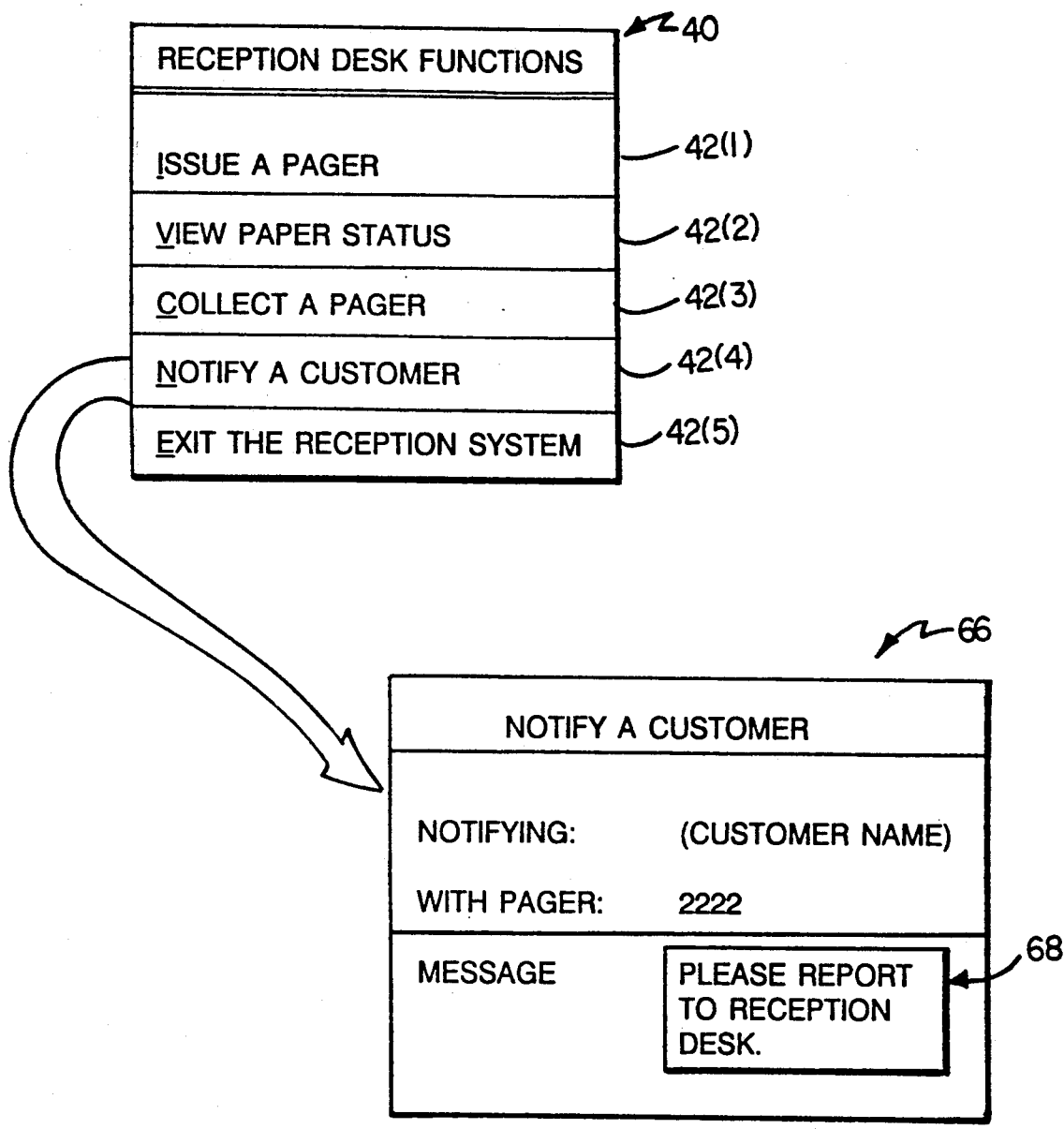
FIG. 2 is a reception desk functions menu.

When a customer enters the travel agency, he is directed to a reception desk where a receptionist determines what services he requires. As part of providing services to the customer, the receptionist uses workstation 6 to access the reception desk functions available on CHAPS 2. A reception desk function menu 40, such as is illustrated in FIG. 2, appears on the display of workstation 6 and offers the receptionist five different options 42(1-5) from which to choose. Assuming the customer is a new customer, the receptionist selects option 42(1), labelled "Issue A Pager". (As a rule, the receptionist selects an option by either typing a letter associated with the desired one of options 42(1-5) (the letter generally identified by some form of highlighting such as underlining) or by using the cursor keys to move a selection bar that also appears on the screen to the desired one of options 42(1-5) and then entering a return.)

In response to selecting "Issue A Pager" option 42(1), workstation 6 displays an "Issue A Pager" form 44, as shown in FIG. 3. "Issue A Pager" form 44 includes several different levels 46(a-f) each of which identifies certain information which the receptionist must enter in order to include the customer into the CHAPS 2 so that he will automatically be notified when an agent is available to serve him. After the receptionist has determined that the customer wants service that the travel agency can provide, the receptionist issues one of pagers 8 to the customer and enters the unique four digit code identifying that pager into level 46(d) and the customer's name into level 46(e).

Then, the receptionist classifies the customer's needs in terms of one of three transaction types, namely, "Holiday", "Sales" or "Service". "Holiday" typically refers to transactions that include some amount of planning, anywhere from a weekend holiday trip to a complete vacation travel itinerary for a family vacation including room travel and meals. "Sales" typically refers to shorter transactions for business travelers such as when the customer has already made his plans and is primarily interested in buying the ticket. "Service" refers to transactions which involve changing previous travel arrangements such as changing a seat assignment, changing the dates of departure or arrival, upgrading the flight, etc. Both "Holiday" and "Sales" transactions are revenue generating; whereas, "Service" transactions are usually non-revenue generating. After the receptionist has classified the type of service required, he enters that classification into CHAPS 2 by entering the appropriate designation onto level 46(a) of "Issue A Pager" form 44.

Typically, when a form requires that a user enter information which represents a selection of alternative choices, CHAPS 2 allows the user to call up a "pick list" that displays the available options and gives the user the ability of selecting one of them.

Next, the receptionist identifies the appropriate service level for the customer, i.e. he classifies the priority of the customer's request. There are three service levels namely, "General", "Priority", and "Immediate", listed in order of increasing priority. In addition, there is a fourth level of classification referred to as "Not Queued". The "Not Queued" classification is for a customer who wants to receive service from the travel agency but does not wish to be "in line" waiting for service at that time possibly because he is completing another transaction and does not wish to be interrupted by a page.

The classifications above "General" are suitable for those customers who may clearly have other pressing commitments or for those customers who for some other appropriate business reason should be given special treatment. After the receptionist has chosen the customer's priority, he enters that choice into CHAPS 2 by selecting the corresponding service level designation listed on level 46(b) of form 44.

After the receptionist has selected the appropriate service level for the customer, level 46(c) of form 44 requires that he indicate the amount of experience required by the travel agent to provide the service requested by the customer. There are three available choices, namely, "Novice", "Experienced" and "Senior". The more complicated the transaction appears to be or the more valued the customer, the higher the level of experience that will be required. The program which generates form 44, however, provides a default selection that is based upon the choice made for service level. If the receptionist wishes to select a different experience level, he may. Thus, for level 46(c), if the selected service level is either "General" or "Immediate", the program defaults to "Novice"; whereas, if the selected service level is "Priority", it defaults to "Experienced". In addition, if a customer is reclassified from "Priority" to "General", the default for experience needed automatically changes from "Experienced" to "Novice". Whereas, if a customer is reclassified to "Priority", the default for experience needed automatically changes to "Experienced".

After the receptionist has entered the customer's name (or has entered no name), the program enters the customer's data into customer database 32 which is stored in file server 20. The program determines the customer's assigned position in queue (i.e., the number of customers that are ahead of that customer in the queue), computes an "estimated time until service" (also referred to as expected wait time) for the customer and displays this information for the receptionist on levels 46(f) and 46(g) of form 44 so that the receptionist may tell the customer when to expect a page. The expected wait time is displayed as a number of minutes and the expected time at which the page will occur. The computation of "expected wait time" is described in detail later.

At this time, CHAPS 2 also sends a test page to the customer's pager. The test page may include the expected wait time for the customer or just be a message such as "Please Wait for Service".

With the aid of reception desk function menu 40 (see FIG. 2), the receptionist can also view the status of a pager by selecting "View Pager Status" option 42(2). When that selection is made, a "View Pager Status" form 60, such as is illustrated in FIG. 4, appears on the workstation display. "View Pager Status" form 60 is very similar to "Issue A Pager" form 40 just described. It includes seven lines 62(1-7), two of which, namely, lines 62(4) and 62(5), require input from the receptionist identifying the pager and the others of which are for displaying information about the identified pager. The receptionist enters the code of the pager for which he wants status information on line 62(3) (or, alternatively the name of the customer on line 62(5)) and the program retrieves and displays the relevant information for the customer to whom the pager is assigned, including transaction type—line 62(5), experience required —line 62(2), and service level—line 62(3). The program also gives the receptionist the ability to change any of these entries through form 60. For example, if the customer has been waiting much longer than his initial estimated wait time and he is becoming very impatient, it may be appropriate to reclassify his service level to "Immediate", which the receptionist or agent can do by making the appropriate entry on line 62(3). Or the receptionist can change the service level of the customer to "Not Queued" so that he will not be disturbed by a page until after he has been moved back to another service level by an agent or a receptionist at a later time.

When "View Pager Status" form 60 has been called up, the program also identifies the customer's position—line 62(6), i.e., the number of customers who are in front of him; the time that has elapsed since he arrived at the reception desk—line 62(7), the wait time he was initially quoted—also on line 62(7), and a revised estimate of the customer's expected wait time until service—line 62(8).

If the receptionist wants to send a message to a particular customer, he can select a "Notify A Customer" option 42(4) on menu 40 and a "Notify A Customer" form 66 will be displayed (see FIG. 2). Form 66 requires that the receptionist identify the customer, either by name or by pager number, before the receptionist is granted access to an area 68 into which the receptionist can type a short message which, when entered, will be sent to that customer's pager 8. This function is not used for paging.

When a customer leaves the agency before being paged, or when an abandoned pager 8 is found in the facility, it is necessary to "unissue" the pager that was assigned to that customer. The receptionist does this by selecting "Collect A Pager" option 42(3) on menu 40 and then typing in the number of the pager he wants to "unissue". In response, CHAPS 2 removes the customer from the queues stored in file server 20.

Finally, to exit from the reception desk functions menu 40, the receptionist selects "Exit the Reception System" option 42(5).

Reservation Desk Functions

The travel consultants, who sit at desks in the Holiday, Sales and Service areas, use the reservation desk functions available through their workstations 10 to report on their status and to call new customers. To access the reservation desk features of CHAPS 2, the reservation (or travel) agent calls up a reservation desk functions menu 70, illustrated in FIG. 5. Menu 70 lists thirteen available options 72(1-13). Before the agent has access to most of options 72(1-13), however, he must sign-in by first selecting "Sign-In" option 72(8) and then typing in a unique identifier that has been assigned to him. After CHAPS 2 has confirmed the identifier, menu 70 uses an information line 74 to display the desk number and the transaction type, i.e. Sales, Service or Holiday, assigned to that agent and then allows the agent to select other appropriate options.

After signing in, the agent generally selects "Page A Customer" option 72(1) to call his first customer. CHAPS 2 requires the agent to confirm his page request, and after doing so, link machine 26 (see FIG. 1) selects the next customer from the appropriate queue in file server 20 (to be described) and sends a message to that customer notifying him to report to desk number of that agent, while also notifying the agent that a customer has been paged. If no customers are available (i.e., none are in queues from which selections can be made), CHAPS 2 notifies the agent that no customers are available.

After the message is sent once, link machine 26 does not automatically repage that customer. Repaging is the responsibility of the agent. If the customer does not show up at the agents desk within a reasonable amount of time, the agent can select a "Repage Next Customer" option 72(2) on menu 70. CHAPS 2 responds by requesting a confirmation and when confirmation is received, the customer is repaged.

After the customer arrives at the agent's desk in response to a page, the agent collects the customer's pager 8, selects "Collect Pager" option 72(4), and enters the pager's unique identifier at his workstation. CHAPS 2 checks the entered pager number against the one that was expected to confirm that the correct customer has shown up at the desk. If the entered pager number is correct, CHAPS 2 informs the agent of this and displays the customer's name, (assuming the customer's name has previously been entered). If the entered pager number is not the one expected, CHAPS 2 notifies the agent of the discrepancy. CHAPS 2 only accepts the expected pager number under "Collect Pager" option 72(4) after it has issued sufficient warning to the user and the greater the discrepency the greater the amount of warning provided.

Entering the correct pager number under "Collect Pager" option 72(4) notifies CHAPS 2 that the travel consultant is currently working with that customer and that the pager assigned to that customer has been "unissued". It also allows the travel agent to select those options on the reservation desk functions menu 70 that are appropriate to completing a transaction with the paged customer.

If the customer does not arrive at the agent's desk after a reasonable amount of time, the agent can select an "Unpage The Customer" option 72(3). In response, CHAPS 2 sends a new page message to the customer notifying him to report to a reception area and assigns the customer to the "Not Queued" service level. When the customer arrives at the reception desk, it is likely the reception agent will reclassify him to an "Immediate" service level.

If a customer reports to the travel consultant's desk but he was not paged there, the agent can select a "View A Customer" option 72(12) and then enter either the customer's name or his pager number to retrieve status information about the customer. CHAPS 2 essentially displays the same information that is available through "View A Pager" form 60 of the reservation desk functions (see FIG. 4). In other words, for the identified customer, CHAPS 2 displays desired transaction; experience required; service level; time since arrival; position in the queue; originally quoted expected wait time; and a new estimated paging time. And if the customer has been paged to another desk, this information is also displayed. If the agent does not have a customer on his way to the desk, "View A Customer" option 72(12) permits the agent to collect the customer's pager and serve him if the agent has the appropriate experience. Or, the agent can reclassify the customer as "Immediate" to reduce his revised expected wait time.

When the agent is currently serving a customer, he can page the next customer by selecting a "Prepage Next Customer" option 72(5). The agent uses option 72(5) when he decides that he will be able to complete serving the current customer during the time it takes for the next paged customer to reach his desk after being paged. CHAPS 2 requires a confirmation of the prepage request.

After the paged customer has arrived at the travel consultant's desk and the agent has collected his pager using "Collect Pager" option 72(4), the agent uses workstation 10 to switch to another applications program that gives the agent access to the particular travel databases necessary to conduct the transactions desired by the customer (e.g., flight reservations, auto rental, hotel reservations, etc.). After completing the transactions, the agent returns to the applications programs on CHAPS 2 (i.e. reservation desk functions menu 70) and selects "End Customer Transaction" option 72(7) to notify CHAPS 2 that he has completed the transaction with the current customer. The program causes an "End Transaction" form 80 to be displayed which requires the agent to enter information about the completed transaction (see, FIG. 6).

"End Transaction" form 80 has an upper half 82 for entering information about the customer and a lower half 84 for entering revenue information relating to the customer's purchase. In upper half 82, the agent is encouraged to enter the customer's name and his telephone number. The other information required to complete upper half 82 is entered by selecting one of a number of available choices listed after each category. There are three categories of information, namely, business type, customer type and transaction type, Under business type, the agent selects either leisure or business. Under transaction type, he selects: new booking, holiday package, reissue (e.g., if the agent reissued a previously issued ticket), or information (e.g., if the customer only wanted information and did not purchase a ticket). And under customer type, he makes selections in three subcategories, namely, sex (male or female), nationality (U.S. or foreign) and age (under 30, 30–50, or over 50).

In lower half 84 of form 80, the agent enters the appropriate revenue data for up to six different purchases, namely, air, car, hotel, holiday, insurance and one "other" category which may be identified by the travel agent. Standard commission rates are stored in file server 20 for air, car, hotel, holiday and insurance transactions and "End Transaction" form 80 displays these standard rates. A commission rate for the "other" category is entered by the travel agent. As the agent completes lower half 84 of form 80, CHAPS 2 automatically computes the dollar value of the commission earned for each purchase and computes a dollar value for the total transaction income, which is the sum of all of the computed commissions on form 80.

After the entries in "End Transaction" form 80 are completed, the agent exits from form 80 and CHAPS 20 stores the entered data in customer database 32 found in file server 20. Generally, the agent is then expected to page a new customer according to the above-described procedures.

If the customer transaction involves a long reissue that will keep the agent busy for an unusually long period of time, the agent can notify CHAPS 2 that he will not be available soon to take another customer. He does this before calling up "End Transaction" form 80 by selecting a "Long Reissue" option 72(6) of reservation desk functions menu 70 and then entering an estimate of the amount of time the reissue will require.

Reservation desk functions menu 70 also includes a "Sign-off" option 72(9) which the agent can use to sign off of the desk to which he is assigned in CHAPS 2. A sign-off is prevented if a customer has been paged to the agent's desk, thereby assuring that the agent takes care of the customer before abandoning the desk (e.g., by providing service to the customer or by unpaging the customer).

A "Handover" option 72(10) is also provided which allows another agent to replace the current agent assigned to a desk. Option 72(10) is useful when a customer has been paged to the desk and the agent is then is called from the desk for some valid reason. When "Handover" option 72(10) is selected, the new agent is required to enter his identification code so that CHAPS 2 is notified of the change. If the experience level of the new agent indicates that he is underqualified for the paged customer, CHAPS 2 issues a warning to the new agent. If the experience level of the agent is "unqualified", CHAPS 2 does not permit that agent to provide service to the customer.

A travel agent can also notify CHAPS 2 that he is temporarily leaving his desk by selecting "Breaks" option 72(11). The agent is then provided with a list of valid reasons for taking a break from which he must select one. CHAPS 2 stores standard times for each of the listed valid reasons and uses these stored times to compute and display an expected return time to the agent.

Finally, reservation desk functions menu 70 includes an exit option 72(13) which allows the agent to temporarily leave the functions of CHAPS 2 so that he can use his workstation to access other available applications programs (e.g. an airline reservations program).

The Queues

Before describing the indexing of the customer database 32 and the different algorithms which implement the resource allocation functions of CHAPS 2, an overview of relevant aspects of the operation of CHAPS 2 will first be provided.

After a customer's pager (or a customer's name) has been entered into CHAPS 2 by the reception agent and before that customer is paged, CHAPS 2 categorizes the status of that customer in accordance with one of three states, namely, "Shopping", "Waiting" and "Angry". As a rule, when the customer is first entered into CHAPS 2, that customer is assigned to "Shopping" status for a preselected period of time, which is referred to as shopping time. While a customer has "Shopping" status, CHAPS 2 will not page that customer. Thus, the customer is effectively provided with a period during which he can visit neighboring retail concessions without being disturbed by a page. For some categories of customers, such as customers who are classified as "Immediate", it may be appropriate to set the shopping time for "Shopping" status to be zero, thereby effectively increasing the priority of those customers and assuring that these customers will be served as soon as possible. The shopping times for the different categories of customers are retained in the Standard Service Time table that is stored in file server 20.

As time progresses, link machine 26 reassigns customers that are waiting to be paged to the other two states, first to "Waiting" status and then finally to "Angry" status. Both "Waiting" customers and "Angry" customers may receive pages depending upon the availability of agents and their priority relative to the other customers in those states. Customers having "Angry" status are selected for service before customers having "Waiting" status. The reassignments to these states occur at predetermined times after the arrival of the customer, i.e., the time at which the reception agent entered the customer into CHAPS 2. Thus, with some exceptions to be described, link machine 26 increases the priority of a customer for receiving service as the customer's time in CHAPS 2 increases.

Link machine 26 also selects customers that are to be paged as travel agents become available. The selection process is done according to a set of priority rules that are based upon the service level and, as just noted, on the status of the customer. To perform the selection function, link machine 26 relies upon the indexed customer database 32 in which the customers who are waiting to be paged are essentially organized into a set of queues 102, such as are shown in FIG. 7. When an agent requests that a customer be paged, link machine 26 selects the next customer from one of the queues in customer database 32 based upon a selection algorithm that will be described.

(Note that FIG. 7 merely provides a useful way of visualizing the way in which customers in the customer database 32 are organized by an index of that database. There are no physical locations in memory that are assigned to the respective queues.)

There are a total of 54 queues, one group of 27 queues for customers that were entered by the receptionist and a second group of 27 queues for customer's whose status was changed by the controller using functions that will be described later. FIG. 27 shows only 27 of the queues of one of the groups. A corresponding queue for each of the 27 shown in FIG. 7 also exists in the other group.

Each of the 27 queues 102 is classified according to transaction type (i.e., Sales, Service or Holiday), according to service level (i.e., General, Priority or Immediate), and according to customer status (i.e., "Shopping", "Waiting" or "Angry"). The 27 queues represent every different possible combination of those three characteristics. When a customer is entered into CHAPS 2, that customer is initially assigned to the appropriate one of the nine "shopping" queues. As time passes, link machine 26 reassigns customers to other of the queues 102 and when an agent becomes available, selects the next customer to be served from an appropriate one of the other queues. With some exceptions that will become apparent, customers are selected from the "Waiting" queues and the "Angry" queues on a first-in-first-out basis, i.e., the customer who has been assigned to a queue the longest is the first customer in that queue to be paged to go to the desk of a travel agent.

CHAPS 2 employs a commercially available database manager program, such as BTRIEVE, to organize and store the customer-related information as customer records in customer database 32. The database manager indexes the customer records in accordance with at least five information fields of a customer record 202, as shown in FIG. 8. Each time a new customer record is added to the customer database or information of a customer record is changed, the database manager automatically reindexes the customer records in the database 32. The indexing fields are as follows: field 204(1) contains transaction type (i.e., Sales, Service or Holiday); field 204(2) contains service level (i.e., General, Priority or Immediate); field 204(3) contains customer status (i.e., Shopping, Waiting or Angry); field 204(4) contains a flag (designated as flag F) indicating whether or not the customer was reclassified to another service level by the controller; and field 204(5) contains the position of the customer in that particular queue (as determined by when the customer entered the queue relative to others in the queue). Flag F is set whenever a customer was transferred to a different queue by actions of the controller, otherwise it is cleared. The first three fields 204(1-3) identify the particular one of the 27 different queues shown in FIG. 7 to which the customer is assigned. And field 204(4) indicates the particular group of 27 queues to which the customer is assigned, i.e., the group corresponding to customers who were transferred by the controller or the group corresponding to customers who were assigned to queues by either a receptionist or an agent.

Note that unless otherwise stated, the following description ignores the distinction created by flag F and assumes that there are a total of 27 queues which are defined by the above-identified first three fields of customer record 202.

Link machine 26 modifies the entry in field 204(3) of the customer records to reassign customers to different queues as their status changes over time. Thus, for example, to move a customer from a "Shopping" queue to a "Waiting" queue, link machine 26 merely changes the entry in field 204(3) of the appropriate record from "Shopping" to "Waiting". And link machine 26 selects a customer from a queue by identifying the customer in that queue having the earliest entry time into that queue.

Referring to FIG. 9, the employee database 33 stored in file server 20 contains a record 41 for each of the travel agents employed by the agency. Each record 41 has a name field 43(1) for the name of the employee, and an identification field 43(2) for the employee's ID., which is required to sign onto CHAPS 2. Each record 41 also includes three experience fields 43(3), 43(4) and 43(5) for the employee's experience level in each of the three travel service areas, namely, Sales, Service and Holiday. The entries in fields 43(3), 43(4) and 43(5) may be one of the following: unqualified, novice, experienced or senior. There is also a function field 43(6) for designating the job function performed by that employee (e.g., reception, travel consultant, supervisor, etc.). Other fields are available for indicating the status of the agent during operation of the travel agency. For example, there is a desk field 43(7) for indicating the desk at which the employee is signed in, a queue flag field 43(8) for indicating whether the agent has paged a customer and thus has been assigned to an agent request queue (to be described later), and a employee queue time field 43(9) for indicating the time at which the employee entered the agent request queue. Of course, there are fields in addition to these for other information that is useful to the operation of CHAPS 2 and the travel agency.

Reassignment Algorithm

With this background, the algorithms that CHAPS 2 employs to reassign customers to other queues, to select customers for service and to estimate the wait times will now be described.

Figure 10A:
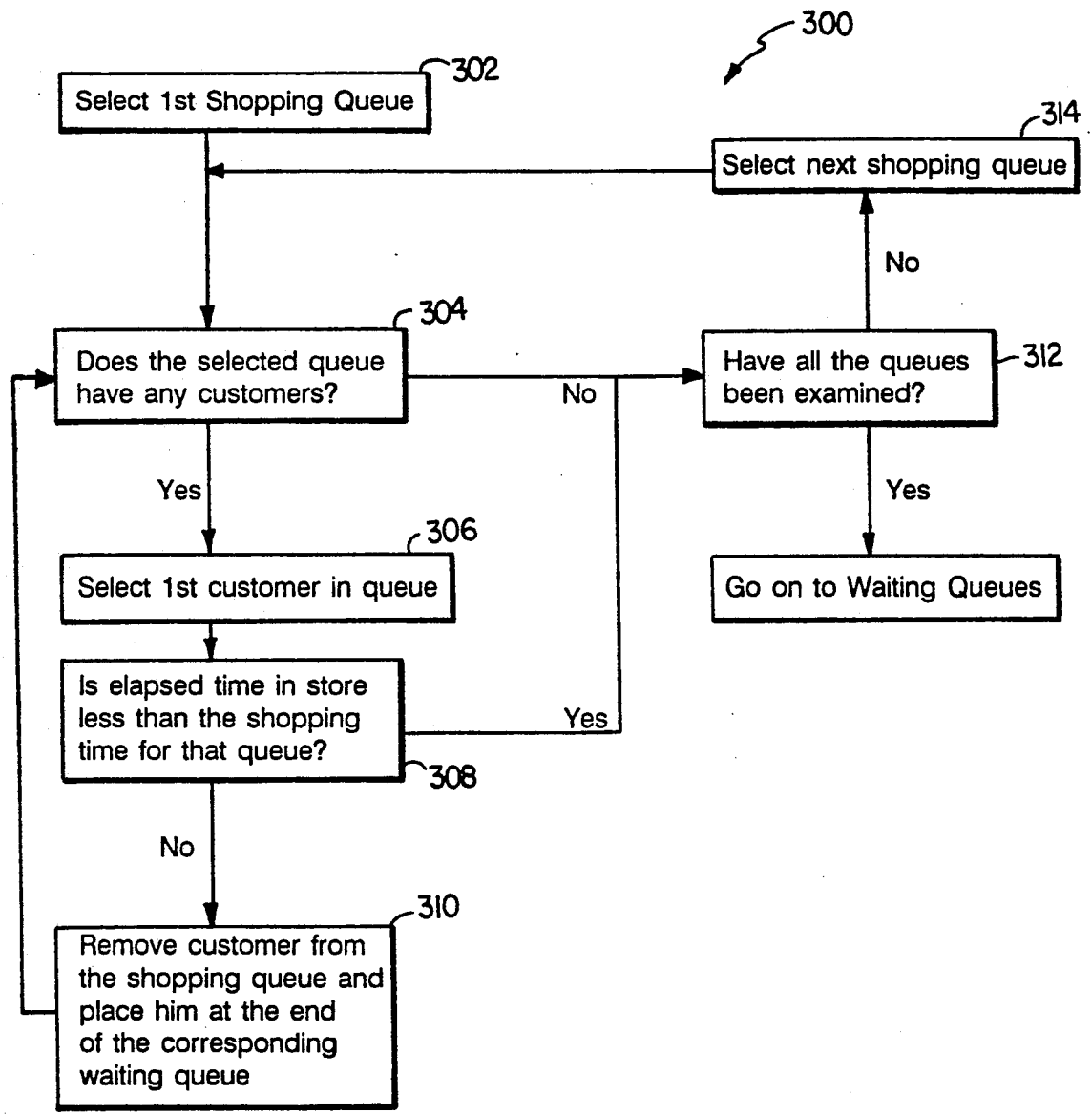
FIGS. 10a and 10b are a flow chart of the reassignment algorithm.
Figure 10B:
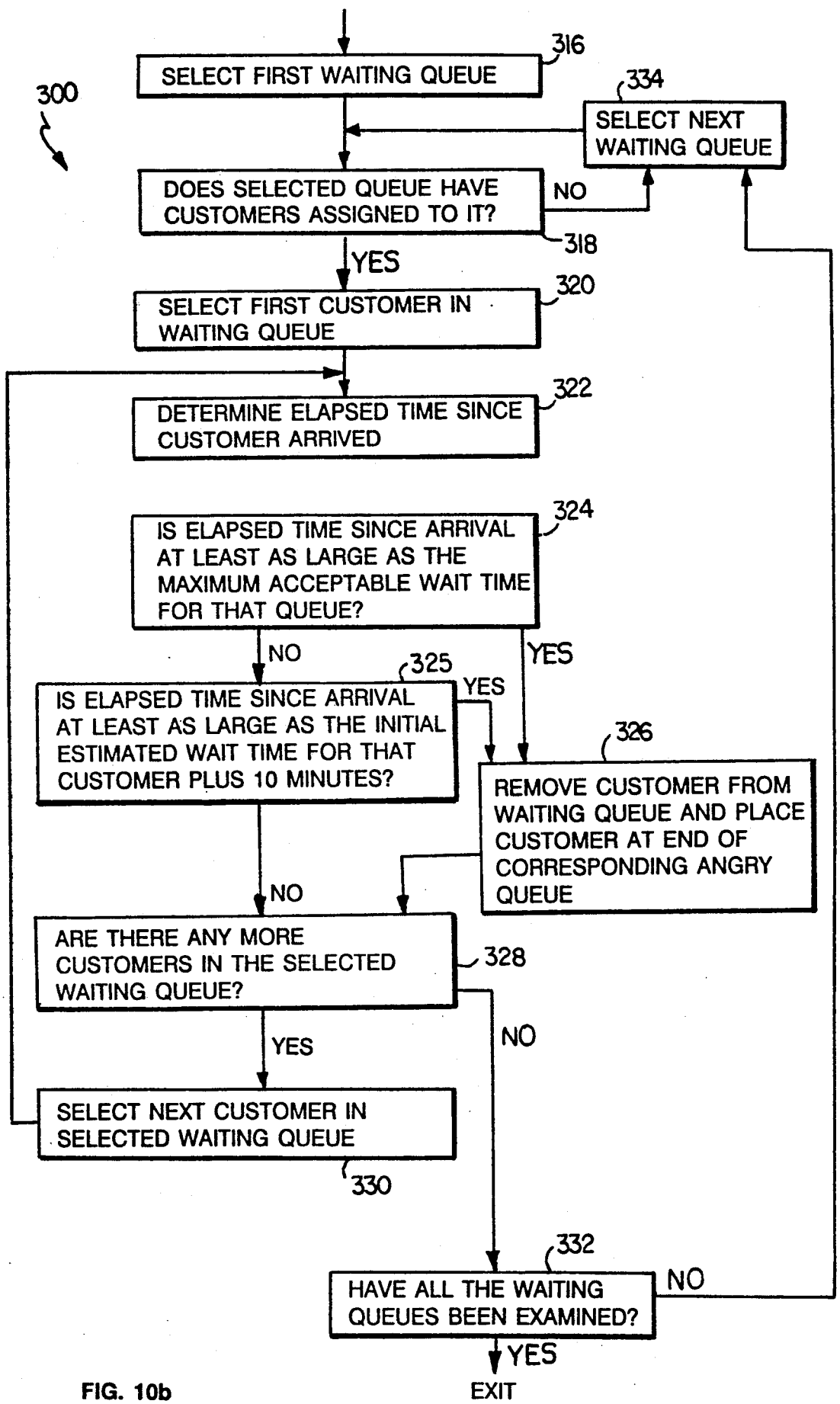

To reassign customers to different queues as their elapsed time since arrival increases, link machine 26 employs a reassignment algorithm 300 (see FIGS. 10a and 10b). Link machine 26 begins by selecting the first shopping queue (step 302) and then checking to determine whether it has any assigned customers (step 304). If there are customers assigned to that queue, the first customer is selected and the time which has elapsed since the customer arrived is determined (step 306). The customer's elapsed time since arrival is then compared to a threshold shopping time as associated with that queue (step 308). If the customer's elapsed time since arrival is at least as great as the designated shopping time for that queue, the customer is removed from the selected shopping queue and placed into the corresponding waiting queue (step 310). The transfer to the waiting queue is accomplished by changing the status designation in field 204(3) of the appropriate customer record 202 in customer database 32 which automatically causes the customer records to be resorted (see FIG. 8). In this case, the designation is changed from Shopping to Waiting.

If the customer has been reassigned, there may be other customers in the shopping queue who need to be reassigned. Thus, the link machine 26 returns to step 304 and analyzes the next customer in the queue. If the customer has not been reassigned, the first-in, first-out nature of the shopping queue ensures that no other customer in the queue will need to be reassigned. In this case, the link machine 26 determines whether or not all the shopping queues have been examined (step 312). If all shopping queues have been examined, link machine 26 transfers to the portion of algorithm 300 which examines the waiting queues. On the other hand, if shopping queues exist which have not yet been examined, link machine 26 transfers to step 314 in which it selects the next shopping queue and returns to step 304 to repeat the above described steps 304–312. In step 304, if the selected queue does not contain any customers, and in step 308, if it is determined that the elapsed time is less than the designated shopping time for the selected queue, then in both cases link machine 26 branches to step 312 where it determines whether there are any other unexamined shopping queues.

In the portion of algorithm 300 relating to the waiting queues algorithms 300 follows a procedure similar to that performed for the shopping queues with the exception that in this case all customers within the queues are examined not just the first customer. Thus, algorithm 300 selects a waiting queue (step 316) and then determines whether or not the selected queue has any customers (step 318). If customers are present in the selected queue, the first customer is selected (step 320) and his elapsed time since arrival is determined (step 322). The customer's elapsed time since arrival is then compared to a first threshold, namely, the maximum acceptable wait time specified in the Standard Service Time Tables that are stored in file server 20 (step 324). If the customer's elapsed time since arrival is less than the first threshold, then it is compared to a second threshold, namely, the initial estimate of wait time (that was computed for that customer at the reception desk) plus ten minutes (step 325). In either step 324 or step 325, if the customers elapsed time since arrival is at least as large as the threshold to which it is compared, then that customer is removed from the waiting queue and placed at the end of the corresponding angry queue (step 326). As before, this is accomplished by merely changing the designation in status field 204(3) of the appropriate record 202 in customer database 32.

If the customer's elapsed time since arrival is less than both the first and the second thresholds of steps 324 and 325, then algorithm 300 passes over that customer without changing his queue and determines whether any more customers are assigned to the selected waiting queue (step 328).

If there are other customers assigned to the selected waiting queue, the next customer in the queue is selected (step 330). Algorithm 300 then branches back to step 322 and repeats the above-described sequence of steps 22 through 328 for the next selected customer. If in step 28, there are no more customers in the selected waiting queue, a check is made to determine whether all of the Waiting queues have been examined (step 332). If all the Waiting queues have been examined, algorithm 300 exits. On the other hand, if there are waiting queues which have not been examined during this run of the program, algorithm 300 goes to step 334 in which it selects the next unexamined waiting queue and then branches to step 318 where it repeats the above described steps 320 through 332 for that queue. In this way, each customer in each waiting queue is examined to determine whether or not his elapsed time has been sufficiently long to require that he be transferred to the Angry queue.

Recall that a customer may be placed into a "Not Queued" status. This may occur because, for example, the customer while waiting to be paged decided to make a purchase in a neighboring retail concession. At that time, the salesperson serving him may wish to call a receptionist and report that the customer wants to complete his purchase and should not be disturbed by a page. In that event, receptionist may put that customer into the "Not Queued" status until the customer again notifies the receptionist that he has concluded his purchase and wants to receive a page when an agent is available. When the customer is reassigned, he is put into a queue based upon how much time has transpired since he arrived. Generally, this will mean that he is put into an appropriate "Angry" queue in which he will receive the lowest priority (since he was the most recent addition to that queue). Of course, the receptionist may assign the customer to a lower priority queue depending upon the circumstances.

Customer Selection Algorithm

Figure 11:
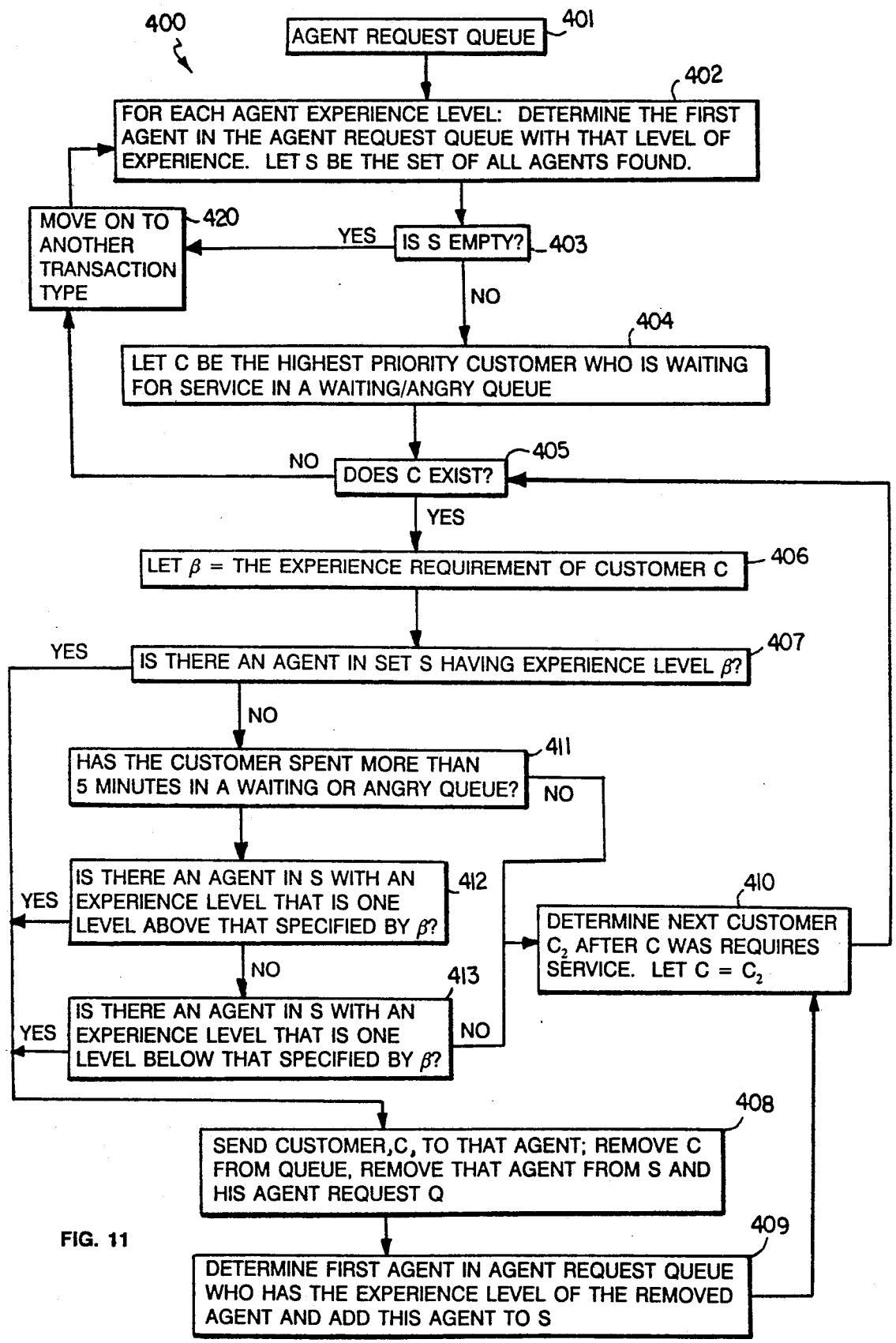
FIG. 11 is a flow chart of the selection algorithm.

To select customers from the queues for assignment to a travel agent, link machine 26 employs a selection algorithm 400 (see FIG. 11). Since there are three different transaction types, namely, Sales, Service and Holiday, selection algorithm 400 is run for each of the transaction types. In the following description of algorithm 400, the execution of the algorithm for a single transaction type is detailed.

When an agent requests a page of the next customer, the request goes into an agent request queue specific to the agent's current function (i.e. Sales, Service or Holiday) and the agent's level of experience for that function (i.e., novice, experienced or senior) (step 401). The time at which the agent requests the customer page is recorded and saved in employee database 33 as part of that agent's record. That time (which is also the time the agent entered his particular agent request queue) is used to order each agent's request in the corresponding agent request queue to allow for first-in, first-out processing of agent requests.

For a given transaction type, algorithm 400 examines each of the agent request queues for that transaction type, identifies the first agent in each agent request queue and places those agents into a set S (step 402). Algorithm 400 then determines whether set S is empty (step 403).

If set S is not empty, algorithm 400 searches for the highest priority customer who desires service and is not shopping (step 404). The search begins by first examining the Immediate/Angry/F=0 (i.e., flag F cleared) queue and then the Immediate/Angry/F=1 (i.e., flag F set) queue (for that transaction type) to determine if there are any customers in those queues. In other words, customers that were transferred by the controller, as indicated by flag F being set, are selected after the other customers in the companion queue, indicated by flag F being cleared, are selected. If no customers are waiting in either of those queues, the search continues through each of the other queues in the same manner, looking first at the flag F cleared queue and then the flag F set queue for each level of the search until either a customer is found or until all the queues have been examined. The search proceeds through the Immediate/Waiting/F=0 queue, the Immediate/Waiting/F=1 queue, the Priority/Angry/F=0 queue, the Priority/Angry/F=1 queue, the Priority/Waiting/F=0 queue, the Priority/Waiting/F=1 queue, the General/Angry/F=0 queue, the General/Angry/F=1 queue, the General/Waiting/F=0 queue, and the General/Waiting/F=0 queue, in that order. If a queue is found that contains customers, the first customer in the queue is chosen.

If set S is empty, algorithm 400 moves onto another transaction type (step 420) and conducts a new search for customers to match up with pending agent requests under that transaction type. That is, after selecting the next transaction type, algorithm 400 returns to step 402 and repeats the steps of algorithm 400.

After the search through the queues has been completed, algorithm 400 then determines whether its search identified a customer (step 405). If the search did not turn up any available customers, algorithm 400 again moves on to another transaction type by branching to step 420. However, if the search found a customer, algorithm 400 then attempts to send the chosen customer to an agent who most closely matches his desired experience level. First the customer's desired experience level is determined and a variable $\beta$ is set equal to the customer's desired experience level (step 406). Then, algorithm 400 checks the set of agents S to determine whether it contains an agent having the experience level specified by $\beta$ (step 407). If there is an agent in S who has the desired experience level, the customer is sent to that agent (step 408). Also in step 408, the selected customer is removed from his queue and the agent's page request is removed from both set S and the corresponding agent request queue.

After that agent has been removed from set S, algorithm 400 identifies the next (i.e., the first) pending agent request in the agent request queue corresponding to the experience level of the agent that has been removed and, if such an agent exists, adds that agent to Set S, thereby replacing the agent that was removed from set S (step 409). With the updated set of agent requests S, algorithm 400 then searches for the next customer requiring service (step 410). In step 410, the search that is conducted follows the procedure described above in connection with step 404. After the search in step 410 is completed, algorithm 400 branches back to step 405 and repeats the above-described sequence of steps.

In step 407, if there is no agent in set S having the desired experience level, as specified by $\beta$, algorithm 400 determines whether the customer should be sent to either an overqualified or an underqualified agent. First, a check is made of whether the customer spent more than five minutes outside of his shopping queue (step 411). If the customer spent no more than five minutes outside his shopping queue, the customer will continue to wait for the proper agent. That is, algorithm 400 does not page that customer but rather branches to step 410 to select a next customer.

On the other hand, if the customer did spend more than five minutes outside his shopping queue, algorithm 400 determines whether there is an agent in S having an experience level that is one level above the experience level specified by $\beta$ (step 412). If there is such an agent in S, a branch is taken to step 408 and the customer is sent to that agent. If no such agent exists in set S, algorithm 400 then determines whether there is an agent in S having an experience level that is one level below the experience level specified by $\beta$ (step 413). If there is such an agent in S, a branch is taken to step 408 and the customer is sent to that agent. If no such agent exists in set S, algorithm 400 branches to step 410 to select a next customer. In short, if the customer has waited more than five minutes outside his shopping queue for a properly qualified agent, CHAPS 2 relaxes the experience level constraint.

Wait Time Estimating Algorithm

Figure 12A:
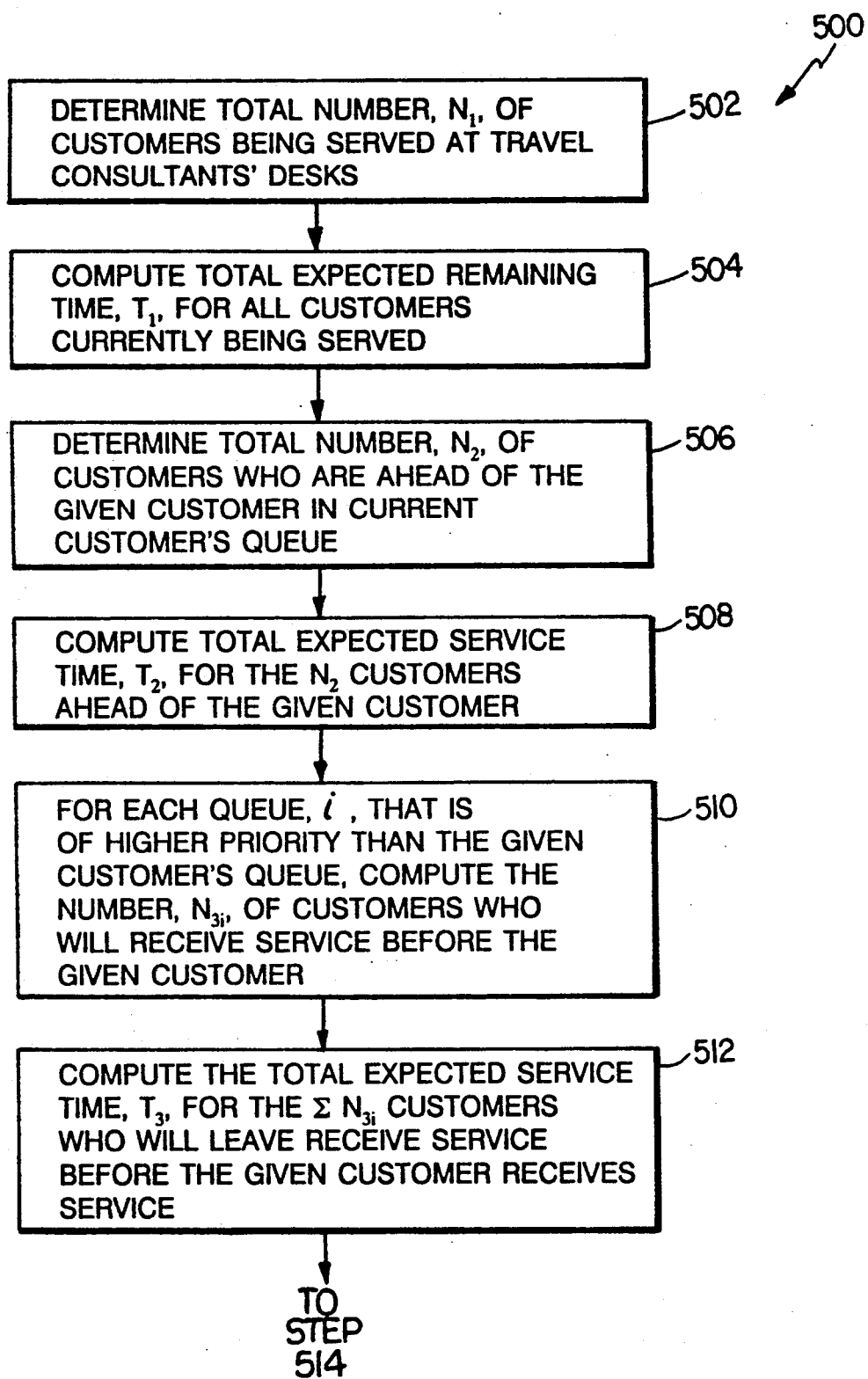
FIGS. 12a and 12b are a flow chart of the wait time estimating (WTE) algorithm.
Figure 12B:
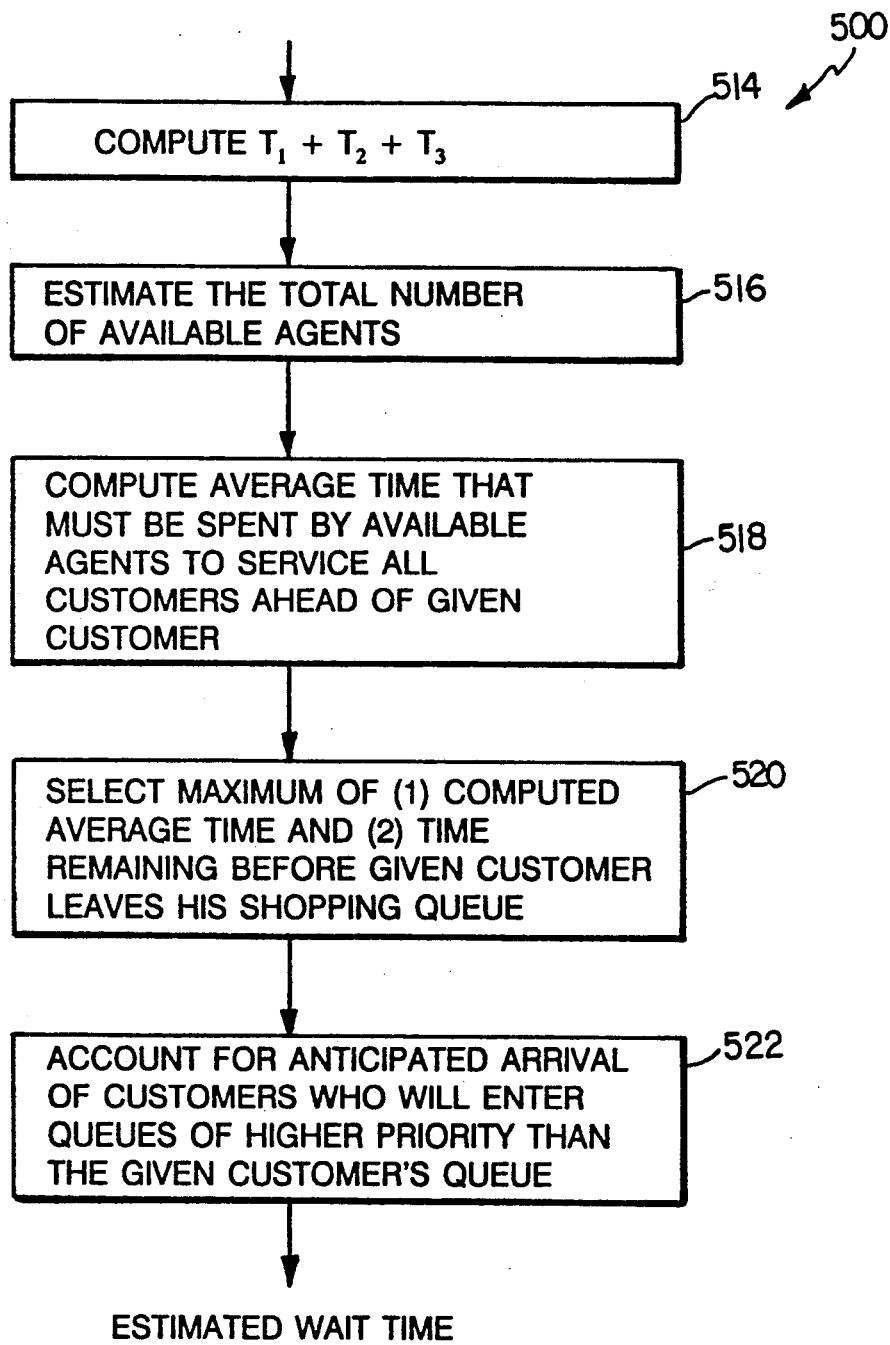

Each time that a reception agent enters a new customer into CHAPS 2 and each time that any agent calls up status information on a customer or a pager, the workstation implements a wait time estimating (WTE) algorithm 500 (see FIG. 12a and 12b) that computes a new estimate of the time the customer must wait until service is available. WTE algorithm 500 estimates a customer's wait time based upon the transaction type assigned to that customer, based upon the queue to which that customer is assigned and based upon that customer's position in that queue. WTE algorithm 500 estimates the given customer's wait time as follows.

Initially, WTE algorithm 500 determines the total number, $N_1$, of customers that are currently being served at desks of travel agents assigned to providing the transaction type requested by the given customer (step 502). $N_1$ is derived from the data maintained in travel consultant database 34 and it equals the total number of travel agent's desks that are currently active minus the number of those desks that are either on break or involved in a long reissue.

WTE algorithm 500 then estimates the total remaining time, $T_1$, required to complete serving the $N_1$ customers currently being served (step 504). This is roughly approximated by assuming a random incidence into a service time distribution at the travel agents' desks and by assuming a standard fixed service time for all services. Thus, for example, if all services are assumed to take 15 minutes, regardless of transaction type, then the average expected time for completing service for a customer under the assumption of random incidence is 7.5 minutes. And $T_1$ is equal to 7.5 times $N_1$. Of course, other service time distributions may be used to refine the resulting estimate. For example, the service times can be assumed to be uniformly distributed over a predetermined time interval and different service time distributions can be used for each of the different transaction types.

Next, WTE algorithm 500 determines the total number of customers, $N_2$, in the given customer's queue who are ahead of that customer (step 506) and computes a total expected service time, $T_2$, for those $N_2$ customers (step 508). For step 508, algorithm 500 again uses the assumption that mean service times equal the standard fixed service time and sets $T_2$ equal to $N_2$ times the mean service time. Note that this ignores the initial expected wait time criterion that is used to reassign customers to queues, that is, it assumes strictly FIFO queues.

After accounting for all customers who are ahead of the given customer in the given customer's queue, WTE algorithm 500 accounts for all customers in other queues who are ahead of the given customer. That is, for each queue, $Q_i$, that is of a higher priority than the given customer's queue, algorithm 500 determines the number, $N_{3i}$, of customers in that queue who will receive service before the given customer (step 510). In step 510, only those queues associated with the given customer's transaction type are considered. If the given customer is in a shopping queue, then with regard to all higher priority shopping queues, WTE algorithm 500 only considers those customers that have a remaining shopping time that is equal or less than the given customer's remaining shopping time. On the other hand, if the given customer is not in a shopping queue, then the customers in all shopping queues are ignored in this step 510.

Note that WTE algorithm 500 ignores the lower priority queues at this point since, for one thing, customers in queues of lower priority will generally not preempt the given customer once the given customer enters his waiting queue. Thus, for example, if the given customer is in a Priority/Shopping queue for a Sales transaction, then only the following Sales related queues are considered: Immediate/Shopping, Immediate/Waiting, Immediate/Angry, Priority/Waiting and Priority/Angry.

Using the numbers determined in step 510, WTE algorithm 500 then computes the total expected service time, $T_3$, for those customers from other queues who will receive service before the given customer. In particular, $T_3$ is computed as follows:

$$T_3 = (\Sigma_i N_{3i})(\text{standard service time}), \quad (\text{step 512}).$$

In the next step, WTE algorithm 500 sums the previously computed expected wait times, namely, $T_1$, $T_2$, and $T_3$, to arrive at an estimate of how much time it will take to service all customers that are ahead of the given customer (step 514).

To estimate how quickly the travel agents can deliver that amount of service, WTE algorithm 500 first determines the total number of available agents, $N_A$—which is equal to the number of agents that are signed in minus the number of agents that are on break or involved in long reissues (step 516) and then divides $T_3$ by $N_A$ (step 518). If $T_3/N_3$ is less than the remaining time that the given customer will spend in his shopping queue (assuming he is in a shopping queue), then WTE algorithm 500 selects the remaining shopping time as the basis for approximating the estimated wait time (step 520). On the other hand, if $T_3/N_3$ is at least as great as the remaining time in the shopping queue or if the given customer is not in a shopping queue, then WTE algorithm 500 selects $T_3/N_3$ as the basis for approximating the estimated wait time.

The algorithm outlined above assumes that several agents are available at the steady state level, i.e. that (# of agents signed in)—(long reissues)—(# of agents on break) is constant. As a relatively simple enhancement, it would be possible to keep a table of expected changes to the steady state. For example, if ten agents are expected to start a shift at 9 AM this could be noted in a special table and easily incorporated into steps 518 and 520.

To account for the subsequent arrival of other customers who enter higher priority queues before the given customer receives service, WTE algorithm 500 multiplies the number selected in step 520 by an adjustment factor, M (step 522) to generate the estimated wait time for the given customer. Assuming an aggregate additional arrival rate, L, into the waiting queues from all queues of higher priority than the given customer's queue, WTE algorithm 500 computes M as follows:

$$M = [1 - (L/N_A)(\text{standard service time})]^{-1}.$$

Of course, the value selected for L depends upon the customer load experience of the particular travel agency and may vary as a function of time to reflect changes in that load over the course of a day.

Controller Functions

The controller accesses the information and control functions that are available on CHAPS 2 by calling up a controller functions menu 90 (illustrated in FIG. 13) at his workstation. Controller functions menu 90 lists eight options, namely, a "Tables" option 92(1), an "Agent Information" option 92(2), a "Desk Information" option 92(3), a "Queue Control" option 92(4), a "Service Standards" option 92(5), a "Wait Time Estimates" option 92(6), a "Pager Information" option 92(7) and an exit option 92(8).

Selecting "Tables" option 92(1) calls up a controller tables menu 94 that presents the controller with two additional selections, namely, a "Control Tables" option 6(1) and a "Status Tables" option 96(2). "Control Tables" option 96(1) causes a control information table 110, such as is illustrated in FIG. 14a, to appear. The information displayed in table 110 is grouped into two categories, namely, information relating to the current status of customers in the travel agency and information relating to the current status of the travel agent desks. The customer status information includes the number of customers that are currently assigned to each of the 27 queues (listed under the headings: "Shopping", "Waiting" and "Angry"), the number of customers currently paged or at a travel agent's desk (listed under "In Service") and the total number of customers that are in the store according to transaction type and service level (listed under "Total"). The displayed numbers under the heading "Total" do not include those customers currently being paged or at an agent's desk (i.e., those customers under "In Service") but they do include the number of customers who have "Not Queued" status.

The desk status information includes, for each of the three transaction types (i.e., "Sales", "Service" and "Holiday"), the total number of desks in each of three categories, namely, "Open", "Unavailable" and "Needed". A desk is considered to be "Open" if a travel consultant has signed in on that desk. A desk is considered to be "Unavailable" if the agent who signed in at the desk has subsequently notified CHAPS 2 by using "Breaks" option 72(4) on reservation desk functions menu 70 (see FIG. 5) that he is on break or by using "Long Reissue" option 72(6) that he is in a long reissue. And the "Needed" numbers represent estimates of the total number of desks that are needed to deliver a certain level of service for the average customer load in the agency at that time.

Figure 15:
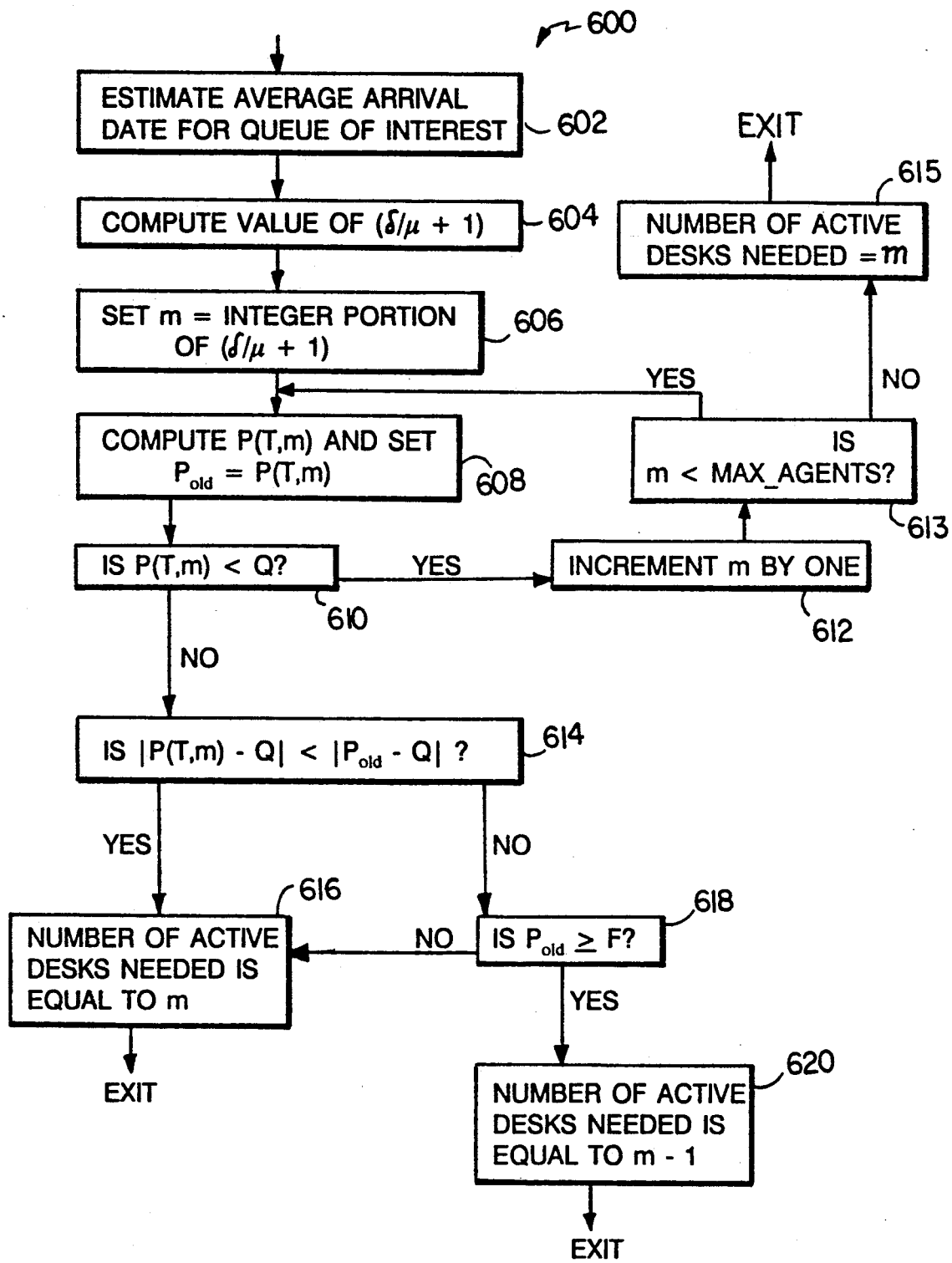
FIG. 15 is a flow chart of the queueing model subroutine.

To compute the number of desks needed, the controller's workstation runs a queueing subroutine 600 (see FIG. 15) that models the waiting queues as M/M/m systems, i.e. Markovian queues. The model assumes the entry into the waiting queue is Markovian, it assumes steady state and it ignores any non-FIFO criteria for the waiting queues. A customer arrival rate, $\delta$, for the waiting queue is estimated by looking at the number of customers that have entered the agency in the last hour for a particular transaction type. In accordance with the Markovian model, it is further assumed that the customers enter the agency in a Poisson manner with rate $\delta$ and that the transaction time for each customer is exponentially distributed with mean of $1/\mu$. (The value of $1/\mu$ is retained in the Service Standards database that is stored in file server 20 and is predetermined based upon the performance of the agents.) If the number of active desks that are servicing the queue is equal to m, then a workload of $\sigma = \delta/(m\mu)$ is defined for the system. Classical queueing theory then states that the probability, P(t,m), that a customer waits longer than t time in the queue given m servers is equal to:

$$P(t,m) = P_0 \frac{(m\sigma)^m}{m!(1-\sigma)} \exp[-m\mu(1-\sigma)t],$$

where $P_0$ is the probability that the M/M/m queue is empty when the customer arrives and equals:

$$P_0 = \left[ \sum_{k=0}^{m-1} \frac{(m\sigma)^k}{k!} + \frac{(m\sigma)^m}{m!(1-\sigma)} \right]^{-1}$$

Two standards of performance are used to determine the required number of active desks, namely, Q, a quality objective and F, a minimum acceptable level of quality (or quality floor). Both Q and F are expressed as the fraction of customers who should wait less than T time to receive service. Queueing algorithm 600 finds the number of active desks required to most closely meet the quality objective without violating the quality floor. That is, queuing algorithm 600 finds the smallest integer value of m that yields the minimum value of $|Q-P(T,m)|$ while still satisfying the following condition: $P(T,m) \geq F$. Note that, for the purpose of these computations, it is assumed that setting a target of 80% (i.e., Q=0.8) of the customers waiting less than 5 minutes (i.e., T=5) is equivalent to "the probability that a customer waits less than 5 minutes is greater than or equal to 0.8".

The values of Q, F, and T are retained in the Standard Service Time Tables and are retrieved by algorithm 600 when needed.

Queueing algorithm 600 includes the following steps. Initially, the average arrival rate, δ, for the particular queue of interest is estimated by looking at the number of customers who have entered the agency in the past hour and who will ultimately arrive at the particular waiting queue of interest (step 602). Then, algorithm 600 computes the value for $(\delta/\mu+1)$ (step 604) and sets a variable m is set equal to the integer portion of the result (step 606). Next, algorithm 600 computes P(T,m) using the abovedescribed equation and sets a variable $P_{old}$ equal to the result of that computation (step 608).

After a value for P(T,m) is available, it is compared to Q (step 610). If P(T,m) is less than Q, m is incremented up by one (step 612) Algorithm 600 then tests m to make sure that it is less than a variable specifying the maximum number of agents which are possible, namely, MAX_AGENTS (step 613). If m is less than MAX_AGENTS, algorithm 600 branches to step 608 to compute a P(T,m) for the new value of m (step 612). If m is not less than MAX_AGENTS, algorithm 600 indicates that the number of agents needed is m and then exits (step 615).

In step 610, if P(T,m) is at least as large as Q, algorithm 600 determines whether it is closer to Q than the last value of $P_{old}$ (step 614). More specifically, algorithm 600 tests for the following condition:

$$|P(T,m)-Q| < |P_{old}-Q|.$$

If that condition is satisfied, then algorithm 600 indicates that the number of active desks needed is equal to the current value for m (step 616). If the condition is not satisfied, $P_{old}$ is compared to F (step 618). If $P_{old}$ is less than F, a branch is taken to step 616 and the number of active desks needed is set equal to m. On the other hand, if $P_{old}$ is at least as large as F, indicating that the previous value for m achieves the minimum acceptable standard of performance for the system, then algorithm 600 indicates that the number of active desks needed is equal to m−1 (step 620).

Figure 13:
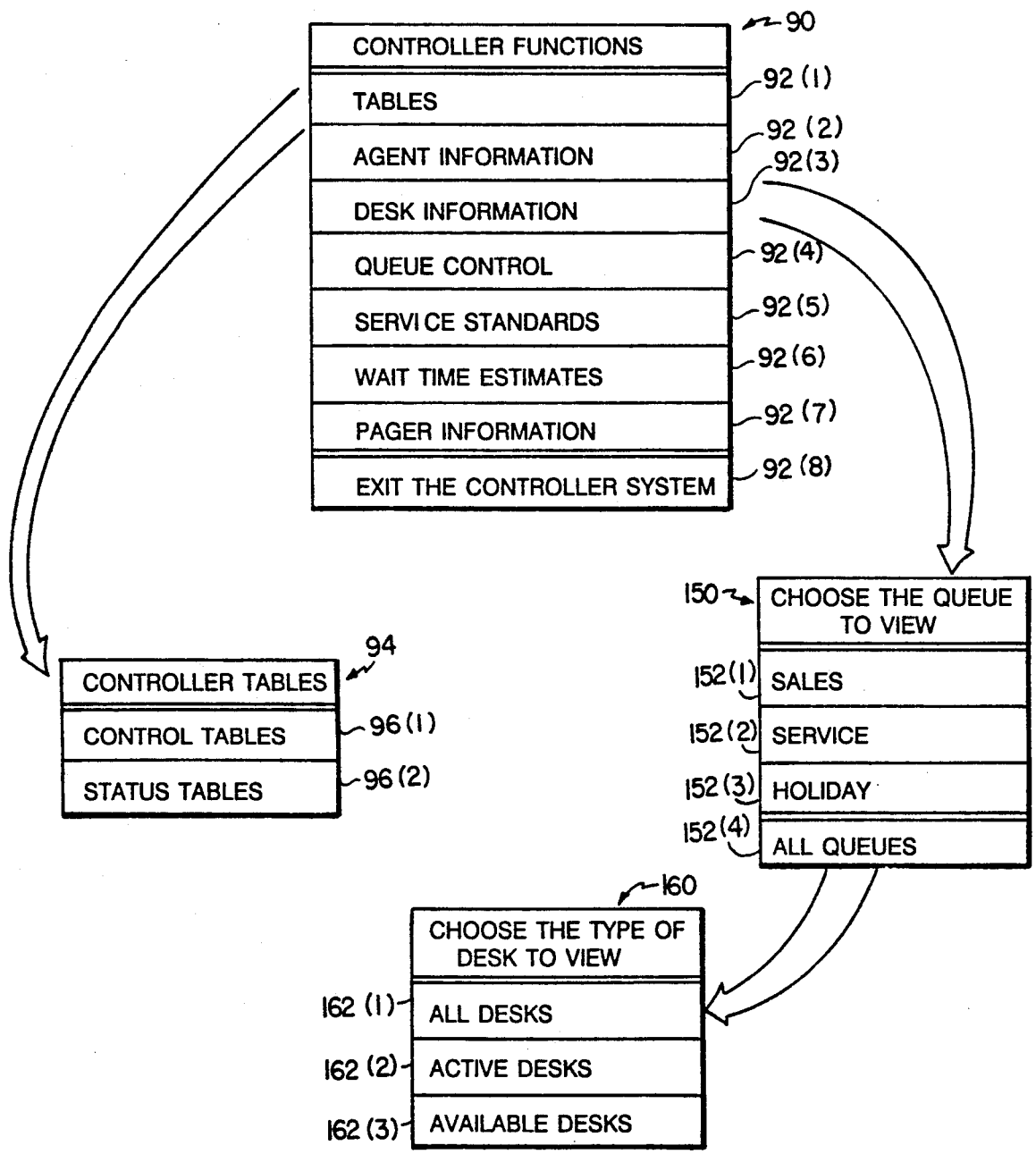
FIG. 13 illustrates a controller functions menu as well as several functions that are accessible through that menu.

Referring back to controller tables menu 94 shown in FIG. 13, the controller can determine the financial performance of the agency on that day by selecting "Status Tables" option 96(2) which causes a status information table 120, such as is illustrated in FIG. 14b, to appear. The information displayed in table 120 reflects the current performance of the travel agency for that day as measured from the opening time until the current time. The status information is grouped into three categories, namely, agent-related information (under "Agent"), customer-related information (under "Customer") and measured of the quality of service provided (under "Service Quality"). The agent-related information, which is displayed as totals as well as according to transaction type, includes: the total commissions earned since opening time ("Commissions"); the total number of hours that agents were at desks ("Hours"); the percent of the agents' total desk time that was spent serving customers or waiting for paged customers ("Active"), waiting for customers to be paged ("Waiting"), or being on break ("Break"); and the productivity for the day which is derived by dividing the total commissions by the total number of sign-in hours accumulated by all travel agents ("Productivity").

The customer-related information and service quality (i.e., timeliness) are also displayed as totals for all transaction types as well as for each transaction type. The customer-related information includes the total number of customers who have entered the travel agency ("Count"), the percent of those customers whose pagers were collected at the reception desk or who never responded to their pages ("Lost") and the percent of those customers who were paged multiple times ("Repaged"). Service quality is broken down into three categories, namely, "OK", "Fair" and "Poor" and the numbers under each category represent the percentage of served customers whose service fell within the designated category. Service for a customer is defined as OK if that customer was paged within 5 minutes of the desired wait time (which equals the shopping time for that customer's queue). Service is considered to be "fair" if the customer did not receive "OK" service, but the customer was never reclassified as "Angry". Finally, service is considered to be "Poor" if the customer was reclassified as "Angry" before being paged.

The displayed information in control information table 110 and in status information table 120 are based on customer and transaction statistics that are accumulated in a Q counter file 36. These accumulations are updated each time new information is added to CHAPS 2.

Thus, for example, when an agent enters a new customer who is classified as Holiday/General, the agent's workstation also updates the statistics that are being accumulated in Q counter file 36 so that control information table 110 and status information table 120 reflect the addition of this new customer. In this case, the statistics that are modified for table 110 are those relating to entries 112 and 114 in table 110 and the statistics that are modified for table 120 are those relating to entries 113. After that customer has been assigned to a shopping queue for the required length of time, he is reassigned to the corresponding waiting queue, at which time link machine 26 (which does the reassigning) also modifies the statistics accumulated in Q counter file 36 to update the information displayed in table 110. More specifically, the statistics that are modified are those relating to entries 114, which will show a decrease by one, and entries 116, which will show an increase by one, to reflect the movement of that customer from a shopping queue to a waiting queue.

Similarly, each time an agent signs into a new desk, Q counter file 36 is modified so that the appropriate one of entries 118 are increased by one.

Figure 16:
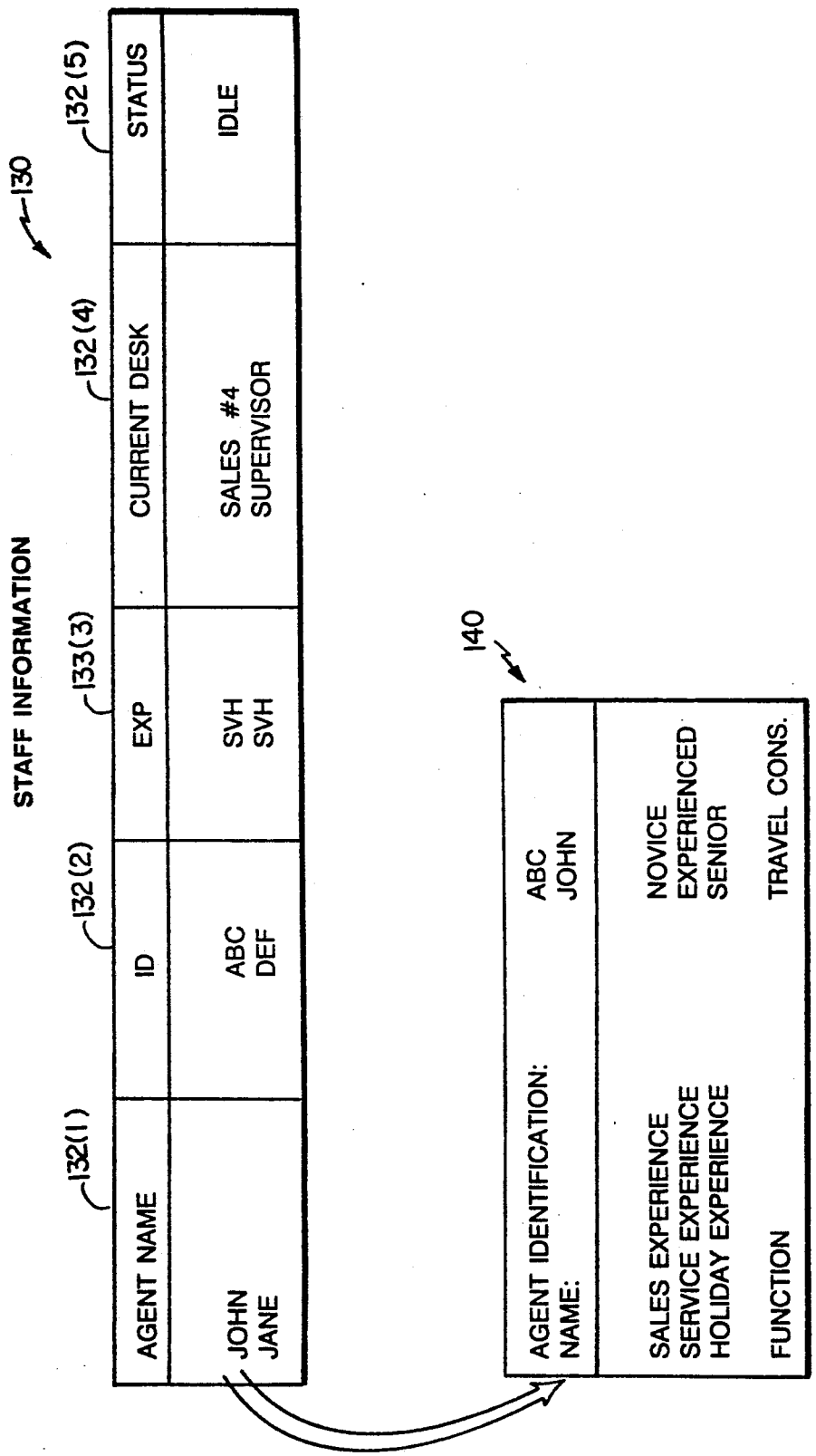
FIG. 16 illustrates a staff information form and an agent information form that is accessible through the staff information form.

The other options available on controller functions menu 90 give the controller information about and control over other aspects of the operation of the travel agency (refer to FIG. 13). For example, the controller can access information about the agents that are staffing desks by selecting "Agent Information" option 92(2) and calling up a staff information form 130, such as is shown in FIG. 16, which displays agent data that is stored primarily in travel consultant database 34. Form 130 includes a name field 132(1) for displaying the names of the agents; an I.D. field 132(2) for displaying a 4-character identification code for each named agent; and an EXP field 132(3) for displaying each agent's experience level in each of the three transaction categories. The entry in EXP field 132(3) is abbreviated so that it occupies minimal space. In particular, "Sales", "Service" and "Holiday" are represented by the letters S, V, and H, respectively, and, on a color monitor the level of experience for a particular transaction type is indicated by the color of the letter corresponding to that transaction type. In addition to the three experience levels identified earlier, a fourth level is also available for this display, namely, unqualified.

If the agent is currently staffing a desk, the desk number and function are displayed in a Current Desk field 132(4). In addition, the status of that desk (e.g., if the agent is on break) is displayed in a status field 132(5).

By moving a display cursor (not shown) to a particular agent's name and then pressing an edit key, the controller can call up an agent information form 140. Screen 140 displays specific information about the selected agent and allows the controller to correct any incorrect information or to update the information stored in file server 20 (only if the agent is not at a desk).

Instead of viewing agent information, the controller can alternatively view desk information by selecting "Desk Information" option 92(3) on controller functions menu 90 (see FIG. 13). In response to selecting option 92(3), the agents workstation screen displays a transaction selector menu 150 which gives the controller the choice of only viewing desks for a specific transaction type (e.g., a selection 152(1) for all Sales desks, a selection 152(2) for all Service desks, and a selection 152(3) for all Holiday desks) or of viewing all desks (selection 152(4)). After that selection is made, a desk type menu 160 is displayed that offers the controller the option of viewing all desks (selection 162(1)), of viewing only active desks (selection 162(2)), or of viewing all available desks (selection 162(3)). Active desks include all desks at which an agent has signed in regardless of whether the agent is present or on break; whereas, available desks include desks at which an agent is present but no customer has been paged for that desk.

Figure 17:
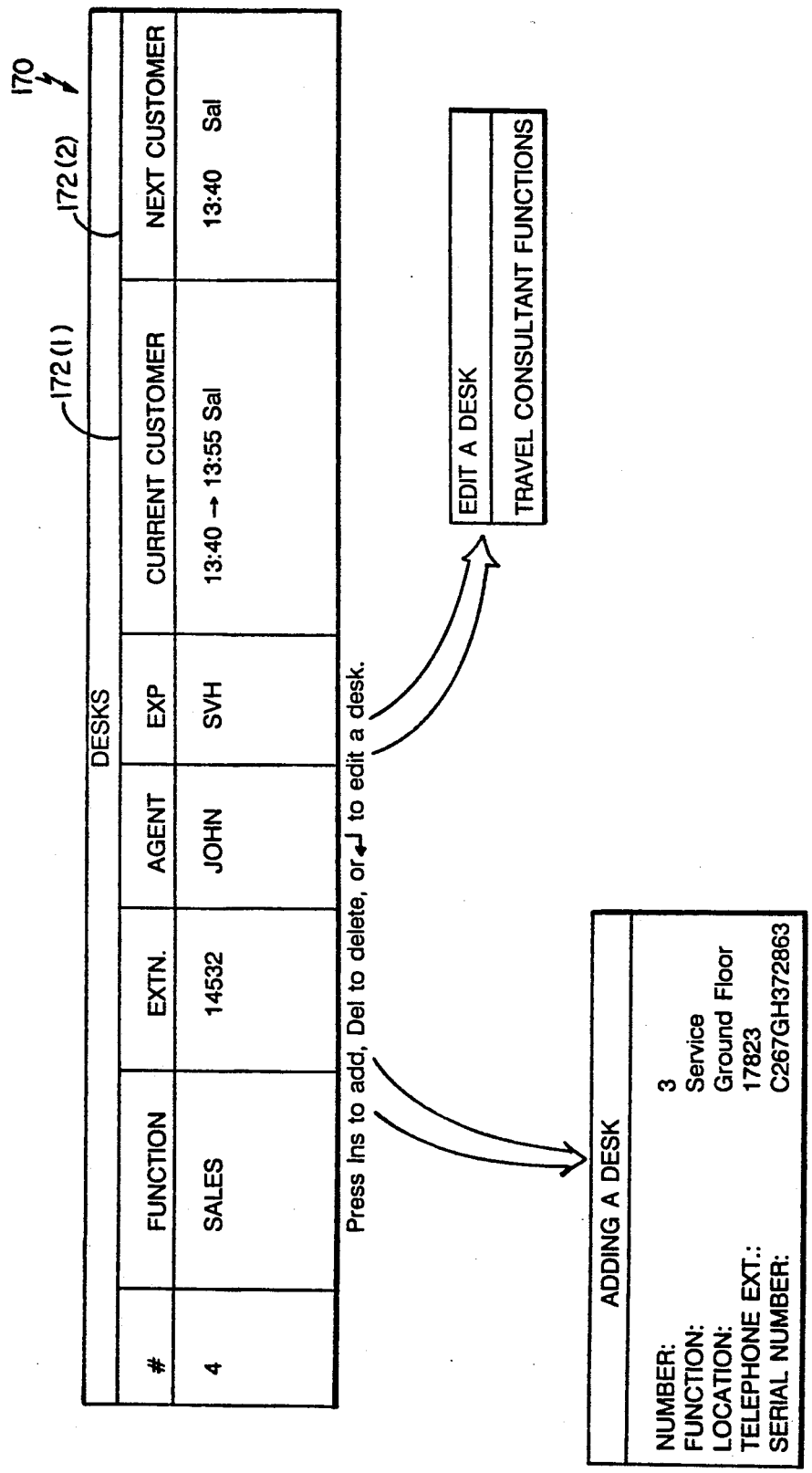
FIG. 17 illustrate forms and menus relating to travel agent desk information that is accessible through the controller functions menu.

After the controller chooses some combination of the above-described selections, a "Desk Information Table" 170 (such as that illustrated in FIG. 17) appears on the workstation screen. Table 170 lists by number all of the desks that the are within the category that controller has selected. For each desk listed, table 170 also identifies the function of the desk (i.e., Sales, Service, or Holiday); the telephone extension at the desk; the name of the agent who has signed in at the desk; and the agents experience level for all transaction types. In addition, table 170 includes a Current Customer field 172(1) and a Next Customer field 172(2). If there is no customer at the desk, Current Customer field 172(1) is blank unless the agent is on break, in which case it will indicate that he is on break and give an expected return time. On the other hand, if a customer is at the desk, Current Customer field 172(1) identifies the time at which the pager of the current customer was collected and the time at which the service is expected to be completed based upon information that is retained in a Service Standards database, which is stored in file server 20. Typically, the expected time required for servicing a customer is derived from the accumulated experience of the agency and stored in the Standard Service Time Table. If the agent is on a long reissue, he will have entered the expected time for the reissue and in that case, it is that time which will appear in field 172(1).

Next Customer field 172 indicates the ability of the agent to page the next customer. If the next customer has been paged, the field 172(2) specifies the time of that page. If the customer has been repaged, the field displays an indication of that fact. Moreover, if the repage was more than 10 minutes ago, that too is indicated.

While viewing "Desk Information Table" 170, the controller can either add or delete a desk or he can edit information associated with an existing desk. The controller may also reclassify a desk, for example, from sales to service, which is an important capability for managing workload. Agent identification and experience are displayed to facilitate proper reclassification.

In the event that the controller learns through control information table 110 (see FIG. 14a) that a large number of customers have remained in a General queue because of their repeated preemption by Immediate or Priority customers, the controller can select a "Queue Control" option 92(4) to override CHAPS 2 and manually transfer a block of General customers to the corresponding Immediate queue. Selecting "Queue Control" option 92(4) causes a "Queue Control Table" 180, such as is illustrated in FIG. 18a, to appear on the controller's screen. Table 180 includes nine categories from which customers may be reassigned to other categories, namely, the three service levels for each of the three transaction type. Table 180 also includes a "# in Queue" column 182(1) indicating the total number of customers that are currently in that queue, a "# to Move" column 182(2) for a controller-entered number of customers to be reassigned and a "To Level" column 182(3) for a controller-entered identification of the service level to which the customers are to be reassigned.

As a rule, table 180 will be used by the controller to move a block of General customers to a Priority queue. Thus, for example, the controller may discover that a large number of customers have been in the Sales/General queue for an unreasonably long time due to an unexpectedly large number of Priority customers entering the travel agency. The controller can balance the customer loads and assure faster service to the General customers by moving a block of General customers to the Sales/Immediate queue as shown in FIG. 18a.

Controller functions menu 90 also gives the controller the ability to review certain user-defined times that control the operation of CHAPS 2. When "Service Time Standards" option 92(5) is selected, a Service Standards Table 190, such as illustrated in FIG. 18b, appears on the controller's screen. Table 190 includes nine categories for which time information is available, namely, the three service levels for each of the three transaction types. Table 190 also includes a "Desired Wait" column 192(1) which lists the shopping time for each of the nine categories and a "Max. Acceptable Wait" column 192(2) which specifies how much time must elapse since the customer's arrival before the customer is automatically reassigned to the corresponding Angry queue.

Controller functions menu 90 provides a feature which allows the controller to override the expected wait times that are being estimated by CHAPS 2 if he believes them to be incorrect. To access this feature, the controller selects a "Wait Time Estimates" option 92(6) and calls up a "Wait Time Table" 194, such as illustrated in FIG. 19. Information in table 194 is organized according to transaction type and, within each transaction type, according to service level. Table 194 includes a "System Waits" column 196(1), which displays the estimated wait times that are currently being given to customers at the reception desk, and a "User Override Waits" column 196(2) into which the controller can enter new estimates and thereby override the Wait algorithm. The manually-set estimates become the basis for the estimated wait times that are displayed at the reception desk until the override is aborted.

This feature allows the controller to account for special information that may not yet be available to CHAPS 2, such as, for example, knowledge about future changes in staffing of the agent desks. This feature also provides a safety valve for CHAPS 2 during the early days of its operation at a new site. Thus, for example, until enough experience is acquired to accurately estimate service times, CHAPS 2 may not be producing sufficiently accurate estimates of wait time for the customers. During this learning period the controller can intervene to make corrections.

It should be apparent from the above description that CHAPS 2 generates a considerable amount of information about the travel agency's customer base and about the performance of agency employees. For example, the databases in file server 20 indicate every time at which a customer walked into the store and was issued a pager, the time at which the pagers were collected, detailed information about the customer and his transaction, and how quickly the agents handled the customers' transactions. This information can be very useful for analyzing the performance of the agency, managing and training the employees and developing effective marketing strategies.

The Management Analysis Program (MAP) taps the potential that is present in the databases generated by CHAPS 2. MAP is run on the controllers workstation to generate a transaction log for every customer from the statistics generated during the operation of CHAPS 2 and then to summarize and analyze the statistics stored in the transaction log. Typically, the transaction log will be updated at the end of each business day. It then can be used by MAPS at any time to reconstruct the performance of the agency during any time period. MAP will be used to generate summary statistics in at least three general areas. First, it will generate reports on how timely the service was provided. Second, it will generate accounting and productivity reports relating to the financial performance of the agency. And, thirdly, it will generate customer information for marketing.

Other embodiments are within the following claims. For example, instead of carrying pagers to receive messages about when an agent is available, the waiting customers could carry transponders that would make it possible for a travel agent to locate the customer. Given the state of technology, it is foreseeable that it will become economically feasible for agents to carry handheld terminals that link them with CHAPS 2 and the other databases they use to provide travel services. When an agent finishes with one customer, he can then use the transponder to locate and go to the next customer.

What is claimed is:

1. A system for allocating service resources to a plurality of individuals who have requested services, the services being of a type requiring that the service resource and a receiver of the services come together at some common location, the system comprising:
a plurality of handheld wireless communication devices, each one of said communication devices for assignment and transfer to a different one of said plurality of individuals;
assignment means for assigning each one of said plurality of individuals to a corresponding one of a plurality of queues, each one of said plurality of queues having a different priority associated with it;
indication means for indicating that a service resource is or will become available to serve a next individual;
selection means responsive to said indication means for selecting the next individual from the queue having the highest priority and having at least one individual assigned to it; and
a wireless transmitter for communicating with the communication device assigned to the next individual so as to notify the next individual that a service resource is available.

2. The system of claim 1 wherein the selection means selects the next individual from a queue on a first-in-first-out basis.

3. The system of claim 1 further comprising means for automatically reassigning individuals assigned to certain of the plurality of queues to other queues, wherein, for each of said individuals so reassigned, the other queue to which the individual is reassigned is of higher priority than the queue from which that individual is being reassigned.

4. The system of claim 3 wherein the reassignment means reassigns the assigned individual based upon the amount of time that has elapsed since the assigned individual was first assigned to one of said plurality of queues.

5. The system of claim 1 wherein at least one of said plurality of queues is a holding queue to which individuals may be assigned and wherein the selection means may not select the next individual from any of said holding queues.

6. The system of claim 5 wherein the assignment means initially assigns each one of said plurality of individuals to a corresponding one of said holding queues.

7. The system of claim 1 further comprising computation means for computing an expected wait time for an assigned individual based upon that individual's position in the queue to which that individual is presently assigned, the expected wait time for an assigned individual being an estimate of how long that individual must wait before being notified that a service resource is available.

8. The system of claim 7 wherein the computation means computes the expected wait time for an assigned individual by estimating the number of individuals that will be served before that individual.

9. The system of claim 8 wherein the computation means estimates the number of individuals that will be served before that individual by determining the number of individuals that are assigned to queues that are of higher priority than the queue to which that individual is presently assigned.

10. The system of claim 7 wherein the computation means computes the expected wait time for an assigned individual by estimating the amount of time required for the service resources to provide services to individuals who will be served prior to the assigned individual.

11. The system of claim 10 wherein the computation means computes the expected wait time for an assigned individual by using a service time distribution to determine the amount of time required for a service resource to provide services to an individual.

12. The system of claim 7 wherein the computation means computes the expected wait time for an assigned individual by estimating the number of service resources that are available to serve individuals.

13. The system of claim 1 further comprising a means for generating a performance measure, the performance measure being based on the time that assigned individuals are in the plurality of queues before being selected for a service resource.

14. The system of claim 1 wherein the requested services are from among a plurality of service types and said plurality of queues includes a group of queues for each service type and wherein the assignment means assigns an individual to a queue within the group of queues that corresponds to the service type assigned to that individual.

15. The system of claim 1 wherein the communication devices are pagers and wherein the transmitter communicates with the pagers by sending a message notifying the individual that a service resource is available to serve that individual.

16. The system of claim 15 wherein the message also identifies the location of the service resource that is available to serve that individual.

17. The system of claim 1 wherein the communication devices comprise transponders and wherein the transmitter communicates with the transponders to determine the physical location of the individual so that the available service resource can be sent to that individual.

18. The system of claim 1 wherein the service resources are employees of a business.

19. The system of claim 1 wherein the selection means selects as the next individual the individual who has been assigned to the queue for the longest period of time.

20. A system for allocating service resources to a plurality of individuals who have requested services, the services being of a type requiring that the service resource and a receiver of the services come together at some common location, the system comprising:
a plurality of handheld wireless communication devices, each one of said communication devices for assignment and transfer to a different one of said plurality of individuals;
assignment means for assigning each one of said plurality of individuals to a corresponding one of a plurality of queues;
computation means for computing an expected wait time for an assigned individual based upon that individual's position in the queue to which that individual is presently assigned, the expected wait time for an assigned individual being an estimate of how long that individual must wait before being notified that service is available;
indication means for indicating that a service resource is or will become available to serve a next individual;
selection means responsive to said indicating means for selecting the next individual from one of said plurality of queues; and
a wireless transmitter for communicating with the communication device assigned to the next individual so as to notify the next individual that a service resource is available.

21. The system of claim 20 wherein the computation means computes the expected wait time for an assigned individual by estimating the number of individuals that will be served before that individual.

22. The system of claim 20 wherein each one of said plurality of queues has a different priority associated with it and wherein the computation means estimates the number of individuals that will be served before that individual by determining the number of individuals that are assigned to queues that are of higher priority than the queue to which that individual is presently assigned.

23. The system of claim 20 wherein the computation means computes the expected wait time for an assigned individual by estimating the amount of time required for the service resources to provide services to individuals who will be served prior to the assigned individual.

24. The system of claim 23 wherein the computation means computes the expected wait time for an assigned individual by using a service time distribution to determine the amount of time required for a service resource to provide services to an individual.

25. The system of claim 20 wherein the computation means computes the expected wait time for an assigned individual by estimating the number of service resources that are available to serve individuals.

26. A system for allocating service resources to a plurality of individuals who have requested services, the services being of a type requiring that the service resource and a receiver of the services come together at some common location, the system comprising:
a plurality of handheld wireless communication devices, each one of said communication devices for assignment and transfer to a different one of said plurality of individuals;
assignment means for assigning each one of said plurality of individuals to a corresponding one of a plurality of queues;
estimation means for estimating the number of service resources needed to provide a predetermined level of service, the estimate being based upon the number of individuals assigned to the plurality of queues;
indication means for indicating that a service resource is or will become available to serve a next individual;
selection means responsive to said indicating means for selecting the next individual from one of said plurality of queues; and
a wireless transmitter for communicating with the communication device assigned to the next individual so as to notify the next individual that a service resource is available.

27. The system of claim 26 wherein the estimation means uses a queueing algorithm to estimate the number of service resources needed.

28. The system of claim 27 wherein the queueing algorithm is based on an assumption that customer arrivals at the queues are characterized by Markovian processes.

29. The system of claim 27 wherein the queueing algorithm is based on an assumption that queues are first-in-first out queues.

30. The system of claim 27 wherein the queueing algorithm is based on an assumption that selections from the queues are characterized by Markovian processes.

31. The system of claim 26 wherein the estimation means estimates the number of service resources needed based upon a moving average of the number of individuals who have requested services for a previous preselected period of time.

32. A method for allocating service resources to a plurality of individuals who have requested services, the services being of a type requiring that the service resource and a receiver of the services come together at some common location, the method comprising:

receiving requests for services from a plurality of individuals;

transfering a plurality of handheld wireless communication devices to the plurality of individuals requesting services, each of said plurality of handheld devices being assigned to a different one of said plurality of individuals;

assigning each one of said plurality of individuals to a corresponding one of a plurality of queues, each one of said plurality of queues having a different priority associated with it;

indicating that a service resource is or will become available to serve a next individual;

selecting the next individual from the queue having the highest priority and having at least one individual assigned to it;

transmitting a signal to the communication device assigned to the next individual so as to notify the next individual that a service resource is available; and providing the requested services to the next individual through the available service resource.

33. The method of claim 32 further comprising:

computing an expected wait time for an assigned individual based upon that individual's position in the queue to which that individual is presently assigned, the expected wait time for an assigned individual being an estimate of how long that individual must wait before being notified that service is available; and notifying the assigned individual of the computed expected wait time.

34. The method of claim 32 further comprising:

estimating the number of service resources needed to provide a predetermined level of service, the estimate being based upon the number of individuals assigned to the plurality of queues; and adjusting the number of service resources that are providing services based upon said estimate.

* * * * *